US012756037B2

(12) United States Patent
Zhi et al.

(10) Patent No.: US 12,756,037 B2
(45) Date of Patent: Oct. 6, 2026

(54) AQUEOUS Zn||$NO_2$ ELECTROCHEMICAL CELL

(71) Applicant: City University of Hong Kong, Hong Kong (HK)

(72) Inventors: Chunyi Zhi, Hong Kong (HK); Longtao Ma, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 705 days.

(21) Appl. No.: 18/346,852

(22) Filed: Jul. 4, 2023

(65) Prior Publication Data

US 2025/0015395 A1 Jan. 9, 2025

(51) Int. Cl.

| | |
|---|---|
| ***H01M 12/08*** | (2006.01) |
| ***C25B 1/27*** | (2021.01) |
| ***C25B 9/23*** | (2021.01) |
| ***H01M 4/38*** | (2006.01) |
| ***H01M 4/88*** | (2006.01) |
| ***H01M 4/90*** | (2006.01) |

(52) U.S. Cl.

CPC ............... *H01M 12/08* (2013.01); *C25B 1/27* (2021.01); *C25B 9/23* (2021.01); *H01M 4/38* (2013.01); *H01M 4/8807* (2013.01); *H01M 4/9016* (2013.01); *H01M 2300/0002* (2013.01)

(58) Field of Classification Search

CPC ...... H01M 12/08; H01M 4/38; H01M 4/8807; H01M 4/9016; C25B 1/27; C25B 9/23

See application file for complete search history.

(56) References Cited

U.S. PATENT DOCUMENTS

2020/0280105 A1* 9/2020 Adams .................. H01M 10/36

OTHER PUBLICATIONS

G. Kresse et al., From ultrasoft pseudopotentials to the projector augmented-wave method, Physical Review B, 1999, 59 (3), 1758.

(Continued)

*Primary Examiner* — Karie O'Neill Apicella

(74) *Attorney, Agent, or Firm* — IDEA Intellectual Limited; Sam T. Yip

(57) ABSTRACT

The present invention relates to an electrochemical cell based on an aqueous Zn||$NO_2$ system with a nano-NiO catalyst deposited as gas diffusion cathode, a metallic Zn foil as anode and a $ZnCl_2$ aqueous solution as electrolyte. Importantly, the electrolyte can efficiently capture $NO_2$, then convert it to $NO_2$ and eventually to the value-added $NH_3$, while simultaneously producing electric power. The obtained electrochemical cell exhibits bifunctional activity and stability (>100 h) towards reversible $NO_2$ reduction and evolution reactions. A high cell-level energy density of 553.2 $Wh \cdot kg^{-1}{}_{cell}$/1589.6 $Wh \cdot L^{-1}{}_{cell}$ from pouch cells (2.4 Ah) has been achieved. As an additional green feature, the produced $NO_2^-$ by the Zn||$NO_2$ cell is subsequently converted to $NH_3$ by a self-power mechanism, thereby servicing multiple key conversion steps in the nitrogen cycle all within a single device, paving the way to scalable, highly integrated solutions.

16 Claims, 16 Drawing Sheets

(56) References Cited

OTHER PUBLICATIONS

John P. Perdew et al., Generalized gradient approximation made simple, Physical Review Letters, 1996, 77 (18), 3865.
Stefan Grimme et al., A consistent and accurate ab initio parametrization of density functional dispersion correction (DFT-D) for the 94 elements H—Pu, The Journal of Chemical Physics, 2010, 132 (15), 154104.
Stefan Grimme et al., Effect of the damping function in dispersion corrected density functional theory, Journal of Computational Chemistry, 2011, 32 (7), 1456-1465.
Anubhav Jain et al., Commentary: The Materials Project: A materials genome approach to accelerating materials innovation, APL Materials, 2013, 1 (1), 011002.
Burak Himmetoglu et al., First-principles study of electronic and structural properties of CuO, Physical Review B, 2011, 84 (11), 115108.
W Tang et al., A grid-based Bader analysis algorithm without lattice bias, Journal of Physics: Condensed Matter, 2009, 21 (8), 084204.
J. K. Nørskov et al., Origin of the overpotential for oxygen reduction at a fuel-cell cathode, The Journal of Physical Chemistry B, 2004, 108 (46), 17886-17892.
Wajdi I. Al Sadat et al., The O2-assisted Al/CO2 electrochemical cell: A system for CO2 capture/conversion and electric power generation, Science Advances, 2016, 2 (7), e1600968.
Hyeokjun Park et al., High-efficiency and high-power rechargeable lithium-sulfur dioxide batteries exploiting conventional carbonate-based electrolytes, Nature Communications, 2017, 8, 14989.
Jiaxin Li et al., Li—CO2 Batteries Efficiently Working at Ultra-Low Temperatures, Advanced Functional Materials, 2020, 30 (27), 2001619.
Jiafang Xie et al., Reversible Aqueous Zinc-CO2 Batteries Based on CO2—HCOOH Interconversion, Angewandte Chemie International Edition, 2018, 57 (52), 16996-17001.
Xueyuan Wang et al., Rechargeable Zn—CO2 Electrochemical Cells Mimicking Two-Step Photosynthesis, Advanced Materials, 2019, 31 (17), 1807807.
Robert C. Armstrong et al., The frontiers of energy, Nature Energy, 2016, 1, 15020.
Martin I. Hoffert, Farewell to fossil fuels? Science, 2010, 329 (5997), 1292-1294.
Richard York, Do alternative energy sources displace fossil fuels? Nature Climate Change, 2012, 2, 441-443.
Diana H. Wall et al., Soil biodiversity and human health, Nature, 2015, 528, 69-76.
Xin Zhang et al., Managing nitrogen for sustainable development, Nature, 2015, 528, 51-59.
Sruti Shiva et al., Ceruloplasmin is a NO oxidase and nitrite synthase that determines endocrine NO homeostasis, Nature Chemical Biology, 2006, 2 (9), 486-493.
Zhoudong Yang et al., Activating sulfur oxidation reaction via six-electron redox mesocrystal NiS2 for sulfur-based aqueous batteries, National Science Review, 2023, 10 (6), nwac268 https://doi.org/10.1093/nsr/nwac268.
Jiahao Liu et al., Sulfur-Based Aqueous Batteries: Electrochemistry and Strategies, Journal of the American Chemical Society, 2021, 143 (38), 15475-15489.
Peter M. Edwards et al., High winter ozone pollution from carbonyl photolysis in an oil and gas basin, Nature, 2014, 514, 351-354.
Jon O. Lundberg et al., The nitrate-nitrite-nitric oxide pathway in physiology and therapeutics, Nature Reviews Drug Discovery, 2008, 7, 156-167.
Claus Haviid Christensen et al., Towards an ammonia-mediated hydrogen economy? Catalysis Today, 2006, 111 (1), 140-144.
Rong Lan et al., Ammonia and related chemicals as potential indirect hydrogen storage materials, International Journal Hydrogen Energy, 2012, 37 (2), 1482-1494.
Defeng Qi et al., High-efficiency electrocatalytic NO reduction to NH3 by nanoporous VN, Nano Research Energy, 2022, 1, e9120022.
Jiafang Xie et al., Reversible Aqueous Zinc-CO2 Batteries Based on CO2—HCOOH Interconversion, Angewandte Chemie Internatinal Edition, 2018, 57 (52), 16996-17001.
Touqeer Ahmad et al., Electrochemical CO2 reduction to C2+ products using Cu-based electrocatalysts: A review, Nano Research Energy, 2022, 1, e9120021.
Jiachen Liang et al., Room-temperature reduction of NO2 in a Li—NO2 battery: a proof of concept, Science Bulletin, 2020, 65 (1), 55-61.
Sang Wook Bae et al., NO removal by reducing agents and additives in the selective non-catalytic reduction (SNCR) process, Chemosphere, 2006, 65 (1), 170-175.
Dimitrios K. Pappas et al., Novel manganese oxide confined interweaved titania nanotubes for the low-temperature Selective Catalytic Reduction (SCR) of NOx by NH3, Journal of Catalysis, 2016, 334, 1-13.
Fei Wang et al., Highly reversible zinc metal anode for aqueous batteries, Nature Materials, 2018, 17, 543-549.
Jingxu Zheng et al., Reversible epitaxial electrodeposition of metals in battery anodes, Science, 2019, 366 (6465), 645-648.
Longtao Ma et al., Toward Practical High-Areal-Capacity Aqueous Zinc-Metal Batteries: Quantifying Hydrogen Evolution and a Solid-Ion Conductor for Stable Zinc Anodes, Advanced Materials, 2021, 33 (12), 2007406.
Hongpeng Li et al., Hierarchical Confinement Effect with Zincophilic and Spatial Traps Stabilized Zn-Based Aqueous Battery, Nano Letters, 2022, 22 (10), 4223-4231.
Xinyu Wang et al., Solid Electrolyte Interface in Zn Based Battery Systems, Nano-Micro Letters, 2022, 14, 205.
Xiaomin Li et al., Solvation Structures in Aqueous Metal-Ion Batteries, Advanced Energy Materials, 2022, 12 (37), 2202068.
Longtao Ma et al., Single-Site Active Iron-Based Bifunctional Oxygen Catalyst for a Compressible and Rechargeable Zinc-Air Battery, ACS Nano, 2018, 12 (2), 1949-1958.
Shengmei Chen et al., Uniform Virus-Like Co—N—Cs Electrocatalyst Derived from Prussian Blue Analog for Stretchable Fiber-Shaped Zn-Air Batteries, Advanced Functional Materials, 2020, 30 (10), 1908945.
Wei Sun et al., A rechargeable zinc-air battery based on zinc peroxide chemistry, Science, 2021, 371 (6524), 46-51.
Jing Pan et al., Advanced Architectures and Relatives of Air Electrodes in Zn-Air Batteries, Advanced Science, 2018, 5 (4), 1700691.
Sambhaji S. Shinde et al., Ampere-hour-scale zinc-air pouch cells, Nature Energy, 2021, 6, 592-604.
Jung-Hwan Kim et al., Nanomat Li—S batteries based on all-fibrous cathode/separator assemblies and reinforced Li metal anodes: towards ultrahigh energy density and flexibility, Energy & Environmental Science, 2019, 12, 177-186.
Makoto Ue et al., Basic knowledge in battery research bridging the gap between academia and industry, Materials Horizons, 2020, 7, 1937-1954.
Longtao Ma et al., Achieving Both High Voltage and High Capacity in Aqueous Zinc-Ion Battery for Record High Energy Density, Advanced Functional Materials, 2019, 29 (46), 1906142.
Eunho Cha et al., Nanoengineering to achieve high efficiency practical lithium-sulfur batteries, Nanoscale Horizons, 2020, 5 (5), 808-831.
Xinhai Yuan et al., Latest Advances in High Voltage and High Energy Density Aqueous Rechargeable Batteries, Electrochemical Energy Reviews, 2021, 4, 1-34.
Simon Dühnen et al., Toward Green Battery Cells: Perspective on Materials and Technologies, Small Methods, 2020, 4 (7), 2000039.
Longtao Ma et al., Super-Stretchable Zinc-Air Batteries Based on an Alkaline-Tolerant Dual-Network Hydrogel Electrolyte, Advanced Energy Materials, 2019, 9 (12), 1803046.
Fanlu Meng et al., In Situ Coupling of Strung Co4N and Intertwined N—C Fibers toward Free-Standing Bifunctional Cathode for Robust, Efficient, and Flexible Zn-Air Batteries, Journal of the American Chemical Society, 2016, 138 (32), 10226-10231.
Kai Han et al., Self-Powered Electrocatalytic Ammonia Synthesis Directly from Air as Driven by Dual Triboelectric Nanogenerators, Energy & Environmental Science, 2020, 13, 2450-2458.

(56) References Cited

OTHER PUBLICATIONS

Gao-Feng Chen et al., Electrochemical reduction of nitrate to ammonia via direct eight-electron transfer using a copper-molecular solid catalyst, Nature Energy, 2020, 5, 605-613.
Jian Jiang et al., Atomic-level insight into super-efficient electrocatalytic oxygen evolution on iron and vanadium co-doped nickel (oxy)hydroxide, Nature Communications, 2018, 9, 2885.
Shenlong Zhao et al., Structural transformation of highly active metal-organic framework electrocatalysts during the oxygen evolution reaction, Nature Energy, 2020, 5, 881-890.
Gao-Feng Chen et al., Effi cient and Stable Bifunctional Electrocatalysts Ni/Ni x M y (M=P, S) for Overall Water Splitting, Advanced Functional Materials, 2016, 26 (19), 3314-3323.
Huong Doan et al., Functionalized Embedded Monometallic Nickel Catalysts for Enhanced Hydrogen Evolution: Performance and Stability, Journal of the Electrochemical Society, 2021, 168 (8), 084501.
G. Kresse et al., Efficient iterative schemes for ab initio total-energy calculations using a plane-wave basis set, Physical Review B, 1996, 54 (16), 11169.

* cited by examiner

AQUEOUS Zn||$NO_2$ ELECTROCHEMICAL CELL

FIELD OF THE INVENTION

The present invention generally relates to the field of electrochemistry or energy storage. More specifically, the present invention provides a high-energy aqueous Zn||$NO_2$ electrochemical cell.

BACKGROUND OF THE INVENTION

The ever-increasing worldwide energy demand and the emission of industrial waste gases and vehicle exhaust (e.g., $NO_2$, NO, $SO_2$, $CO_2$, CO) resulting from the massive combustion of fossil fuels necessitate the development of effective technologies for capturing exhaust gases and converting them into electricity. Among these gases, $NO_2$ released into the atmosphere contributes to photochemical smog, stratospheric ozone deterioration and global warming, leading to significant environmental and health concerns. Therefore, there is an urgent need for a strategy to convert $NO_2$, alleviating $NO_2$ accumulation and simultaneously produce value-added chemicals, such as $NH_3$.

A variety of metal||gas electrochemical cells, such as Li||$CO_2$, Li||$SO_2$, Al||$CO_2$, Zn||$CO_2$ systems, have been proposed as novel approaches to capture exhaust gas streams while providing the additional benefit of electrical energy production[1-6]. In the case of $NO_2$ gas, a Li||$NO_2$ battery has been reported to reduce $NO_2$[7]. However, the Li||$NO_2$ cell produces NO as the final reduzate, which itself is another air pollutant[8-9]. Currently, there is no electrochemical method available to capture and utilize exhausted $NO_2$ for value-added chemicals, while simultaneously generating electrical power.

SUMMARY OF THE INVENTION

In a first aspect, the present invention provides a rechargeable aqueous Zn||$NO_2$ cell, which includes an anode, a gas diffusion cathode formed by at least one nano NiO catalyst-deposited material and located under a gas source, a separator placed between the gas diffusion cathode and the anode, and an electrolyte disposed in a space between the gas diffusion cathode and the anode. The rechargeable aqueous Zn||$NO_2$ cell delivers a high specific capacity of at least 800 $mAh \cdot g^{-1}$ with an output voltage of 1.79 V at 0.2 $mA \cdot cm^{-2}$, and when the current increased up to 20 $mA \cdot cm^{-2}$, the rechargeable aqueous Zn||$NO_2$ cell delivers a high capacity of at least 700 $mAh \cdot g^{-1}$ with at least 90% capacity retention.

In accordance with one embodiment, the nano-NiO catalyst exhibits an electrocatalytic performance of at least 350 mV for overpotential at 10 $mA \cdot cm^{-2}$, and the nano-NiO catalyst exhibits a Tafel slope lower than 65 $mV \cdot dec^{-1}$.

In accordance with one embodiment, the anode includes Zn foil or Zn plate.

In accordance with one embodiment, the electrolyte includes $ZnCl_2$ solution, $Zn(OTf)_2$ solution, $ZnSO_4$ solution, or KOH solution, or a combination thereof.

In accordance with one embodiment, the separator includes polypropylene/polyethylene/polypropylene (PP/PE/PP) separator, poly(tetrafluoroethylene) (PTFE), poly (vinyl chloride) (PVC) and polyamide (PA).

In accordance with one embodiment, the at least one nano NiO catalyst-deposited material comprises carbon fiber cloth (CFC), fluorocarbon-based polymer (e.g., Nafion™), or isopropanol.

In accordance with one embodiment, a device having the nano NiO catalyst exhibits a high open circuit voltage (OCV) of at least 1.8 V under $NO_2$ atmosphere.

In accordance with one embodiment, the rechargeable aqueous Zn||$NO_2$ cell has a peak power density of at least 80 $mW \cdot cm^{-2}$.

In accordance with one embodiment, the gas source is $NO_2$. The rechargeable aqueous Zn||$NO_2$ cell works with at least 3 vol. % $NO_2$ gas diffusing. The gas diffusion cathode is based on the $NO_2/NO_2^-$ redox reaction.

In accordance with one embodiment, the rechargeable aqueous Zn||$NO_2$ cell is of Ah-scale.

In accordance with one embodiment, the rechargeable aqueous Zn||$NO_2$ cell delivers a high energy density of at least 553.2 $Wh \cdot kg^{-1}{}_{cell}$ and a high volumetric density of 1589.6 $Wh \cdot L^{-1}{}_{cell}$.

In accordance with another embodiment, the rechargeable aqueous Zn||$NO_2$ cell demonstrates cycling stability over 100 h at a current density of 5 $mA \cdot cm^{-2}$ with a charge or discharge time of 1 h, and the energy efficiency reaches at least 80%.

More preferably, the present invention provides a 1.8 V, 2.4-Ah-scale aqueous Zn||$NO_2$ electrochemical system. This system utilizes a 3 vol. % $NO_2$/air mixture as an energy carrier to store renewable energy, which exhibits ultrahigh cell level energy density of 553.2 $Wh \cdot kg^{-1}{}_{cell}$ and volumetric energy density of 1589.6 $Wh \cdot L^{-1}{}_{cell}$. The Zn||$NO_2$ cells effectively capture $NO_2$ and convert $NO_2$ to $NO_2^-$ species at room temperature. The Faradaic efficiency of $NO_2 \rightarrow NO_2^-$ reaches 96.4%. The produced $NO_2^-$ can be further converted to $NH_3$ using an electrochemical Haber-Bosch reactor, self-powered by the Zn||$NO_2$ cells.

In accordance with another aspect of the present invention, the present invention provides a self-powered Haber-Bosch reactor for $NH_3$ production. The reactor includes a graphite bipolar plate, an ion exchange membrane, a $TiO_2$/CFC electrode, and at least two rechargeable aqueous Zn||$NO_2$ cells connected in series to drive the subsequent electrocatalytic reduction for $NH_3$ synthesis.

With the duration extended, the voltage maintains 3.0 V unchanged and the output current is approximately 2.1 $mA \cdot cm^{-2}$ over 8 h. The self-powered Haber-Bosch reactor has a self-powered $NH_3$ yield of at least 4 $mM \cdot h^{-1}$ per hour by measuring solution volume involved in the cathode reaction.

BRIEF DESCRIPTION OF THE DRAWINGS

Embodiments of the present invention are described in more detail hereinafter with reference to the drawings, in which.

DETAILED DESCRIPTION

The present invention will be described in detail through the following embodiments with appending drawings. It should be understood that the specific embodiments are provided for an illustrative purpose only, and should not be interpreted in a limiting manner. Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features. Other aspects and advantages of the invention will be apparent to those skilled in the art from a review of the ensuing description.

Air pollution resulting from nitrogen oxides ($NO_2$) in exhausted gases is a long-standing issue, demanding the advancement of novel technologies for capture and abatement. One proposed solution is the utilization of Li||$NO_2$ battery to reduce $NO_2$.

Zinc (Zn) metal is an attractive anode material in aqueous batteries due to its desirable characteristics such as high theoretical capacity (820 $mAh \cdot g^{-1}$), low redox potential (−0.76 V vs. SHE), low cost, abundant reserves, and suitable reactivity. Coupling the Zn anode with an $NO_2$ gas diffusion electrode, the device is capable of electrochemically capturing and converting $NO_2$ through the following overall reaction:

$$Zn+2NO_2 \rightarrow Zn(NO_2)_2 \; E^0=1.85 \text{ V (vs. } Zn/Zn^{2+}) \quad (1)$$

However, the Li||$NO_2$ cell generates NO as the final reduzate, which is an additional air pollutant. Currently, there is no electrochemical method available to capture and utilize exhausted $NO_2$ for the production of value-added chemicals and simultaneous generation of electrical power. Therefore, the present invention introduces a high-energy rechargeable aqueous Zn||$NO_2$ electrochemical cell, which offers a new approach to convert $NO_2$ from exhaust gas streams into value-added products while generating significant amounts of electrical energy.

Figure 1A:
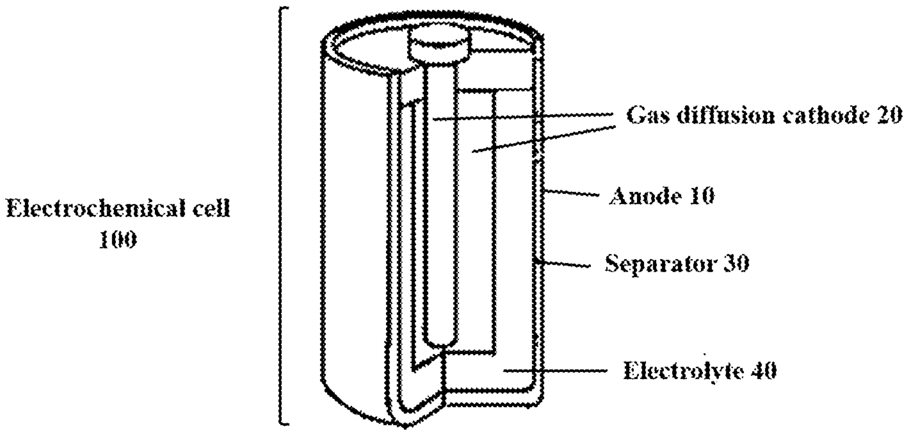
FIG. 1*a* shows a schematic diagram of Zn||$NO_2$ electrochemical cell.

Referring to FIG. 1*a*, the high-energy rechargeable aqueous Zn||$NO_2$ electrochemical cell (100) includes an anode (10), a gas diffusion cathode (20) formed by at least one nano NiO catalyst-deposited material and located under a gas source, a separator (30) placed between the gas diffusion cathode (20) and the anode (10), and an electrolyte (40) disposed in a space between the gas diffusion cathode (20) and the anode (10). The rechargeable aqueous Zn||$NO_2$ cell delivers a high specific capacity of at least 800 $mAh \cdot g^{-1}$ with an output voltage of 1.79 V at 0.2 $mA \cdot cm^{-2}$, and when the current increased up to 20 $mA \cdot cm^{-2}$, the rechargeable aqueous Zn||$NO_2$ cell delivers a high capacity of at least 700 $mAh \cdot g^{-1}$ with at least 90% capacity retention.

More specifically, the Zn||$NO_2$ electrochemical capture system may be operated in either secondary (rechargeable) or primary (non-rechargeable) modes.

Figure 1B:
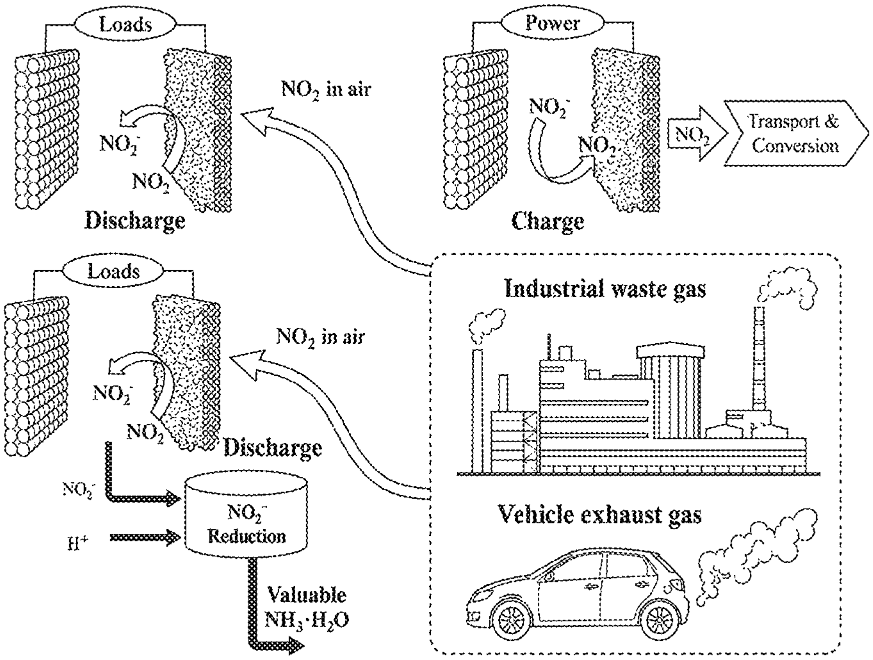
FIG. 1*b* shows architectures of Zn||$NO_2$ electrochemistry technology as a capture system.

FIG. 1*b* shows the architectures of Zn||$NO_2$ electrochemistry technology as a capture system, in which $NO_2$ is reduced to generate electrical energy during discharge process, and $NO_2$ is concentrated by recharging. In a secondary cell, the reduced $NO_2$ species react with oxidized metal ions to form metal nitrates and electricity during cell discharge. Ideally, during the recharge process, the cell undergoes a reverse reaction where electrical energy is consumed to release the captured $NO_2$ at the cathode and regenerate the metal anode. The implementation of such secondary electrochemical process would facilitate the separation and concentration of $NO_2$, based on the below electrochemical reaction:

$$NO_2^- - e^- \rightarrow NO_2 \quad (2)$$

Another configuration according to the present invention is a primary electrochemical cell, in which the metal anode is consumed to generate electrical energy and discharge products. These discharged products can be harvested from the electrode, electrolyte, and other cell components, and then converted into valuable chemicals (FIG. 1), based on the following electrochemical reaction:

$$NO_2^- + 5H{+} + 4e^- \rightarrow NH_3 + 2H_2O \quad (3)$$

In one of the embodiments, a primary Zn||$NO_2$ is used, in which the captured $NO_2$ is converted to valuable products $NH_3$—$H_2O$.

In one of the embodiments, the high energy density is calculated based on the mass of total loaded materials on both electrodes, electrolyte, and package.

In one of the embodiments, the nano-NiO catalyst exhibits an electrocatalytic performance of at least 350 mV for overpotential at 10 $mA \cdot cm^{-2}$, and the nano-NiO catalyst exhibits a Tafel slope lower than 65 $mV \cdot dec^{-1}$.

However, in addition to the nano-NiO catalyst, other catalysts can also be used in the present invention, such as commercial Pt/C, CuO, FeO, CoO and NiO catalysts, or any other material that achieves $NO_2 \rightarrow NO_2^-$.

In one of the embodiments, the anode material may be metal foil or metal plate. The metal may be aluminum (Al), iron (Fe), nickel (Ni), Lead (Pb), or copper (Cu). Preferably, the anode may be Zn foil or Zn plate.

In one of the embodiments, the electrolyte may be $ZnCl_2$ solution, $Zn(OTf)_2$ solution, $ZnSO_4$ solution, or KOH solution, or a combination thereof.

In one of the embodiments, the separator may be polypropylene/polyethylene/polypropylene (PP/PE/PP) separator, poly(tetrafluoroethylene) (PTFE), poly(vinyl chloride) (PVC) and polyamide (PA), or any commercial separators.

In one of the embodiments, the at least one nano NiO catalyst-deposited material may be carbon fiber cloth (CFC), fluorocarbon-based polymer (e.g., Nafion™) or isopropanol.

In one of the embodiments, a device having the nano NiO catalyst exhibits a high open circuit voltage (OCV) of at least 1.8 V under $NO_2$ atmosphere, which is higher than that of the commercial NiO electrocatalyst (1.75V). For example, at least 1.83V, at least 1.85V, or at least 2.0V.

In one of the embodiments, the rechargeable aqueous Zn||$NO_2$ cell has a peak power density of at least 80 $mW \cdot cm^{-2}$. For example, at least 85 $mW \cdot cm^{-2}$, at least 90 $mW \cdot cm^{-2}$, at least 95 $mW \cdot cm^{-2}$.

In one of the embodiments, the gas source is $NO_2$. The rechargeable aqueous Zn||$NO_2$ cell works with at least 3 vol. % $NO_2$ gas diffusing. The gas diffusion cathode is based on the $NO_2/NO_2^-$ redox reaction.

In one of the embodiments, the rechargeable aqueous Zn||$NO_2$ cell is of Ah-scale. Preferably, the rechargeable aqueous Zn||$NO_2$ cell is of 2.4 Ah-scale.

In one of the embodiments, the rechargeable aqueous Zn||$NO_2$ cell delivers a high energy density of at least 500 $Wh \cdot kg^{-1}{}_{cell}$ and a high volumetric density of 1500 $Wh \cdot L^{-1}{}_{cell}$. For example, the energy density can be at least 510 $Wh \cdot kg^{-1}{}_{cell}$, at least 520 $Wh \cdot kg^{-1}{}_{cell}$, at least 530 $Wh \cdot kg^{-1}{}_{cell}$, at least 540 $Wh \cdot kg^{-1}{}_{cell}$, at least 550 $Wh \cdot kg^{-1}{}_{cell}$, at least 560 $Wh \cdot kg^{-1}{}_{cell}$, at least 570 $Wh \cdot kg^{-1}{}_{cell}$, at least 580 $Wh \cdot kg^{-1}{}_{cell}$, at least 590 $Wh \cdot kg^{-1}{}_{cell}$, or at least 600 $Wh \cdot kg^{-1}{}_{cell}$. The volumetric density can be at least 1525 $Wh \cdot L^{-1}{}_{cell}$, at least 1550 $Wh \cdot L^{-1}{}_{cell}$, at least 1575 $Wh \cdot L^{-1}{}_{cell}$, at least 1600 $Wh \cdot L^{-1}{}_{cell}$.

Preferably, the energy density is 553.2 $Wh \cdot kg^{-1}{}_{cell}$, and the volumetric density is 1589.6 $Wh \cdot L^{-1}{}_{cell}$.

In one of the embodiments, the rechargeable aqueous Zn||$NO_2$ cell demonstrates cycling stability over 100 h at a current density of 5 $mA \cdot cm^{-2}$ with a charge or discharge time of 1 h, and the energy efficiency reaches at least 80%. For example, the cycling stability can more than 110 hr, more than 120 hr, more than 130 hr, more than 140 hr, more than 150 hr, etc. The energy efficiency can reach at least 85%, at least 90%, at least 95%.

Additionally, the present invention further provides a self-powered Haber-Bosch reactor for $NH_3$ production. The reactor includes a graphite bipolar plate, an ion exchange membrane, a $TiO_2$/CFC electrode, and at least two rechargeable aqueous Zn||$NO_2$ cells connected in series to drive the subsequent electrocatalytic reduction for $NH_3$ synthesis.

In one embodiment, the produced $NO_2^-$ by Zn||$NO_2$ cell can be further converted to $NH_3$ by two Zn||$NO_2$ cells powered conversion system with an electrochemical Haber-Bosch (eHB) reactor employed.

The following examples illustrate the present invention and are not intended to limit the same.

EXAMPLE

Example 1—Sample Preparation

Preparation of Nano-NiO Particles $Ni(OH)_2$ (1.0 g, 10.79 mmol) was added into a vial, then 2.0 ml of $H_2O$:isopropanol (2:1) was added to the above vial. The suspension was sonicated at room temperature for 4 h to make it a homogeneous mixture. Water and isopropanol were then removed using a rotary evaporator under vacuum condition. The resulting wet slurry was dried in an oven at 50° C. overnight. The solid powder was then heated to 300° C. in a furnace for 3 h to obtain the nano NiO particles.

Preparation of $NO_2$ Gas

The pure $NO_2$ gas was prepared by reducing concentrated nitric acid with copper metal at room temperature. The rate of gas production was controlled by controlling the drop acceleration rate of concentrated nitric acid. The different concentration of $NO_2$ gas was prepared by mixing different volumes of pure $NO_2$ with air using a gas pump.

Example 2

Characterization of Materials

Crystallographic data was collected by a Bruker D2 Phaser X-ray diffractometer with Cu Kα irradiation (k=0.154 nm) operating at 30 kV and 10 mA, respectively. Surface morphology was investigated by scanning electronic microscopy (SEM, JEOL JSM-6335F), transmission electronic microscopy (TEM, Philips CM20), and high-resolution transmission electron microscope (HRTEM, JEOL 2100F). The chemical state and composition were analyzed using an ESCALAB 250 photoelectron spectroscopy (Thermo Fisher Scienctific) at $1.2\times10^{-9}$ mbar using Al Kα X-ray beam (1486.6 eV). All XPS spectra were calibrated by shifting the detected adventitious carbon C is peak to 284.4 eV. For ex-situ studies, the cycled electrodes were washed with a copious amount of water and thoroughly dried in a vacuum at room temperature. The chemical coordinated information was obtained by X-ray absorption fine spectroscopy (XAFS) spectra conducted at the beamline 1W1B of Beijing Synchrotron Radiation Facility (BSRF) at Institute of High Energy Physics, Chinese Academy of Sciences. The storage rings of BSRF were conducted at 2.5 GeV with an average current of 250 mA. The data collection was conducted in transmission mode using ionization chamber when using Si (111) double-crystal monochromator. The data was processed and analyzed similar to previous procedures using ATHENA and ARTEMIS for X-ray absorption near edge structure (XANES) and the extended X-ray absorption fine structure (EXAFS) spectra, respectively.

For electrochemical test, an electrocatalyst/Ketjen black mixture slurry was prepared by dispersing 8 mg of electrocatalyst and 2 mg Ketjen black into 1 mL of mixture solution of 2-propanol, distilled water, and Nafion solution (5 wt %) (10:40:1). Then, the gas electrode was fabricated using a spraying above mixture slurry on carbon cloth and dried at room temperature for 24 h. The loading mass was 0.5 $mg\cdot cm^{-2}$ for all catalysts. A polished Zn plate served as the anode and the electrolyte is 2 M $ZnCl_2$ aqueous solution for rechargeable Zn||$NO_2$ batteries. The gas diffusion layer had an effective area of 1 $cm^2$ and allowed $NO_2$ gas to reach the catalyst sites. The charge/discharge polarization were determined utilizing an electrochemical workstation (CHI 760e, Chenhua). The galvanostatic test were performed using a Keithley 2450 source measurement unit at room temperature.

For ammonia synthesis, the fabrication of the dual-compartment cell and relevant electrocatalytic reduction was shown in detail as follows. A piece of $TiO_2$/carbon cloth (3 cm×2 cm) was combined with a piece of pre-activated Nafion membrane (NRE-211, 3.5 cm×2.5 cm) by a hot press process at 140° C. for 0.5 h. The combination was assembled with two pieces of silicone and custom-made graphite bipolar plates (4 cm×3 cm) with grooves to fabricate the dual-compartment cell. Next, 20 mL of pure water and $NO_2^-$ solution (from Zn||$NO_2$ cell) were recycled in the anode and cathode compartment with the help of two peristaltic pumps, then both reactions were driven by two Zn||$NO_2$ cells connected in series.

Characterization of Liquid Products $NO_2^-$, $NO_3^-$, and $NH_4^+$ productions were detected colorimetric detection methods coupled with UV-vis spectroscopy (PerkinElmer Lambda 2S spectrometer). Detailed detection methods for each kind of ions were shown as following:

(1) Colorimetric Detection of $NO_2^-$

First, diluted electrolyte (5 mL) was mixed with solution containing HCl (0.10 mL, 2.0 M) and sulfanilamide (10 $g\cdot L^{-1}$). After 10 min, a $C_{12}H_{14}N_2\cdot 2HCl$ solution (100 μL, 10 $mg\cdot mL^{-1}$) was added into the above solution with gentle shaking. The absorption of $NO_2^-$ was measured at a wavelength range from 650 to 450 nm after 30 min. The absorbance value of $NO_2^-$ was obtained at the wavelength of 540 nm. Similar to the aforementioned procedure, the standard calibration curve could be obtained by fitting the absorbance of the different known concentrations of $NaNO_2$ (0, 4, 8, 12, and 16 μM).

(2) Colorimetric Detection of $NO_4^+$

The indophenol blue method was used to detect $NH_4^+$. Electrolyte diluted with a $H_2SO_4$ solution (0.05 M) was used as the test sample. A solution (1.25 mL) consisting of NaOH (0.625 M), salicylic acid (0.36 M), and sodium citrate (0.17 M) was added into test sample (2 mL). A sodium nitroferricyanide solution (150 μL, 10 $mg\cdot mL^{-1}$) and NaClO solution (75 μL, available chlorine 4.0 wt %) were further added. After placing the solution in ambient temperature for 2 h, absorption spectra were collected, and the absorbance value at the wavelength of 658 nm was obtained to characterize the $NH_4^+$ concentration. For standard calibration curve, different $NH_4^+$ solutions of known concentrations (0, 5, 10, 15, 20 μM) were obtained by dissolving $(NH_4)_2SO_4$ into $H_2SO_4$ (0.05 M). The obtained absorbance values were then linear fitted for calibration.

(3) Colorimetric Detection of $NO_3^-$

The electrolyte was diluted with $H_2SO_4$ (0.05 M) before testing. Then, a HCl solution (0.10 mL, 1.0 M) was added into a test solution (5 mL). After 15 min, the absorption of $NO_3^-$ was measured at a wavelength range from 300 to 200 nm. The characteristic absorbance of $NO_3^-$ was calculated based on the absorbance value difference at 220 and 275 nm. The standard calibration curve was obtained by fitting different known concentrations of $NaNO_3$ (0, 5, 10, 15, and 20 μM).

Computational Details

All spin-polarized density functional theory (DFT) calculations were performed by employing the projector-augmented wave method implemented in VASP code[10-11]. Perdew-Burke-Ernzerhof flavor of generalized gradient approximation was applied for the exchange-correlation functional[12]. The kinetic energy cutoff, energy and force convergence criteria were set as 400 eV, 10-5 eV, and 0.05 eV/A, respectively. The K-points mesh was set as 3×3×1 for Brillouin zone sampling. DFT-D3 method with Becke-Jonson damping was used to the van der Waals interaction correction[13-14]. DFT+U scheme was applied to correct the self-interaction error for 3d electrons, and U-J values were set as 5.3, 3.32, 6.2, and 7.29 eV for Fe, Co, Ni, and Cu, respectively[15-16]. A vacuum layer with the thickness of 15 Å was added to avoid the spurious interactions between adjacent cells. The charge density difference distribution (CDDD) $\Delta\rho$ of adsorbed $*NO_2$ was calculated as $$\Delta\rho=\rho(*NO_2)-\rho(*)-\rho(NO_2),\ \text{where}\ \rho(*NO_2),\rho(*),$$

and $\rho(NO_2)$ denoted charge density distribution of adsorbed $*NO_2$, clean surface, and $NO_2$ only. The number of charge transfer was estimated by Bader charge analysis[17]. The Gibbs free energy change ΔG was calculated by $$\Delta G=\Delta E+\Delta ZPE-T\Delta S,$$

where ΔE, ΔZPE, and ΔS denotes the changes in DFT-calculated total energy, zero-point energy, and entropic contributions, respectively. The temperature was set as 298K, and the entropy value for $HNO_2$ (g) was extracted from the NIST database (https://doi.org/10.18434/T4D303). Norskov's computational hydrogen electrode (CHE) model was used in the calculations. For ORR, a pH correction term ΔGpH=kT ln 10×pH was applied[18].

Example 3—Fabrication of Aqueous Zn||$NO_2$ Electrochemical Cell

In this example, an aqueous Zn||$NO_2$ electrochemical cell was developed by employing metallic Zn as the anode, electrocatalysts deposited on CFC as cathode, and aqueous solution of $ZnCl_2$ as the electrolyte.

Example 4—Screening Catalysts and Analysis of Catalytic Activity

The screening of electrocatalytic activity for $NO_2^-$↔$*NO_2$ conversion ('*' denotes the adsorbed state) on different metal oxide surfaces, including NiO, CoO, FeO and CuO, was scrutinized analyzed by density functional theory (DFT) calculations.

Figure 2:
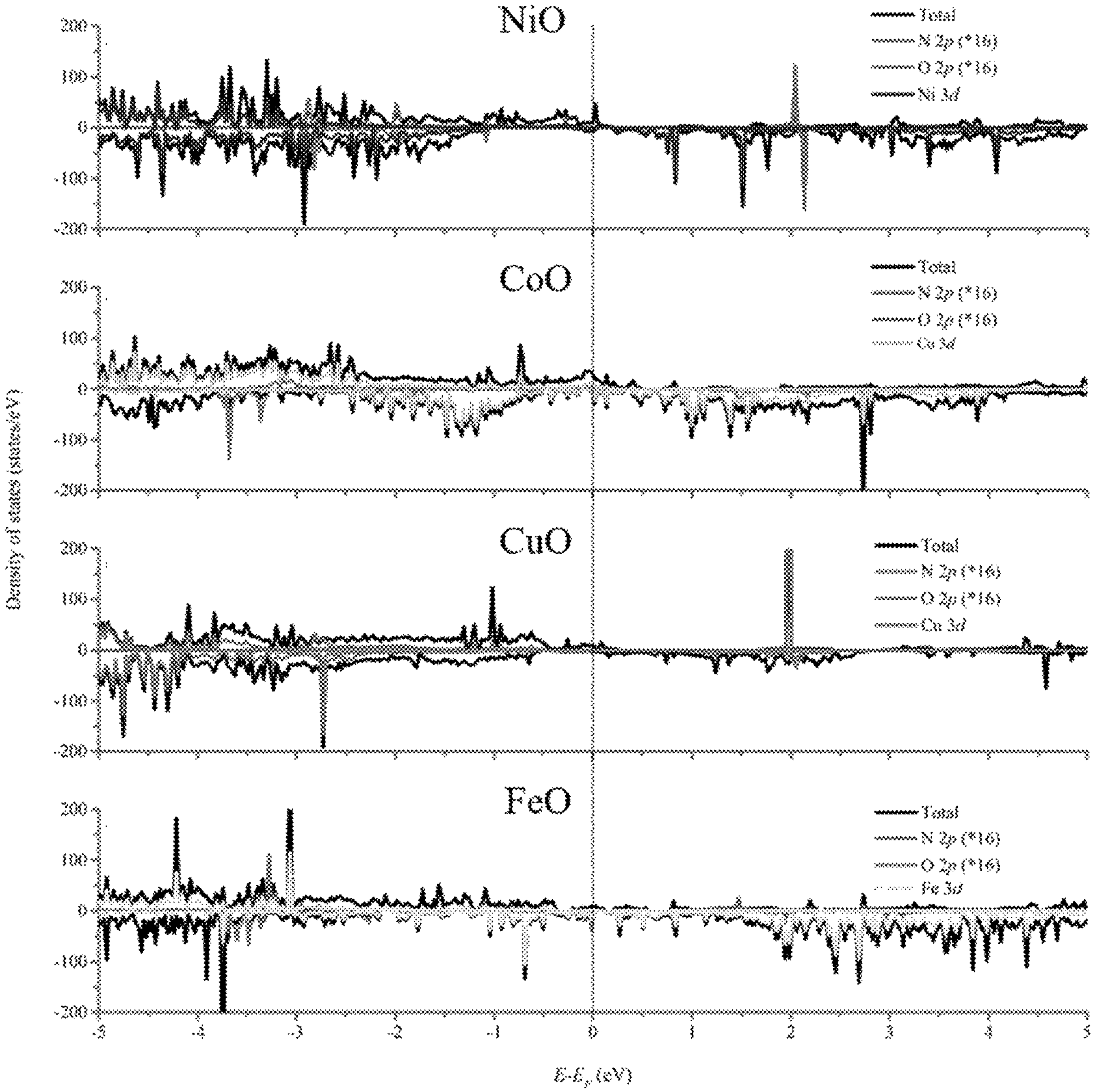
FIG. 2 depicts total and partial density of states (DOS) for $NO_2$ adsorbed on NiO, CoO, CuO, and FeO.

The DOS describes the number of energy states per unit volume or per unit energy interval that are available to particles in a given system. It provides information about the energy levels and their occupancy, which is essential for understanding various phenomena, such as electrical conductivity, thermal conductivity, and optical properties of materials. The DOS is often represented as a plot or a function that shows the energy levels on the x-axis and the density of states on the y-axis. Referring to FIG. 2, the hybridization between transition metal (Ni, Co, Cu, Fe) 3d orbitals and nitrogen/oxygen 2p orbitals at around 2 eV and from −4 to −2.5 eV could be observed, which contributed to the favorable adsorption of $NO_2$.

Figure 3:
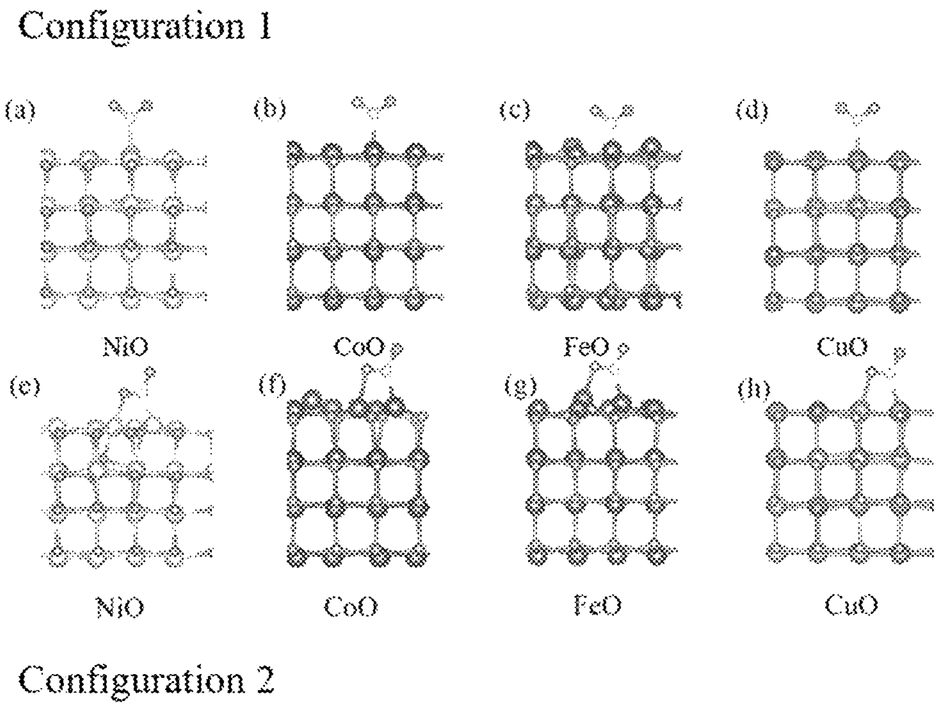
FIG. 3 shows structures of $NO_2$ adsorption configuration 1 and configuration 2 on NiO, CuO, FeO and CuO surfaces. The charge transfers from NiO, CoO, FeO and CuO surface to $*NO_2$.

FIG. 3 shows structures of $NO_2$ adsorption configuration 1 and configuration 2 on NiO, CuO, FeO and CuO surfaces. The charge transfers from NiO, CoO, FeO and CuO surface to *NO. After comparing two different $NO_2$ adsorption configurations (FIG. 3), it could be found that on NiO and FeO, the preferred configuration for $*NO_2$ is configuration 1 and only N atom binds to metal site. On the other hand, on CoO and CuO, the preferred configuration for $*NO_2$ is configuration 2, where both N and O atoms bind to adjacent sites.

Charge density difference distribution (CDDD) refers to the analysis of the spatial variation in the distribution of electron density between two or more different states or configurations of a system. It provides insights into the redistribution of electronic charge, which can be associated with changes in chemical bonding, electronic structure, or reactivity. The analysis of charge density difference distribution provides a deeper understanding of the electronic structure and chemical properties of systems.

FIG. 4 shows (FIG. 4*a*) 2D contour plot (0.005 e $Bohr^{-1}$) of charge density difference distribution (CDDD) of adsorbed $*NO_2$ on NiO, CoO, FeO and CuO with the iso-surface value of 0.005 e $Bohr^{-3}$. Meanwhile, the number of charge transfer from metal oxide surface to $*NO_2$ is also denoted. (FIG. 4*b*) Gibbs free energy diagrams for $NO_2^-$ ↔$NO_2$ conversion on NiO, CoO, FeO, and CuO surface. The Gibbs free energy of CoO is covered by that of NiO. (FIG. 4*c*) The galvanostatic charge/discharge curves of the Zn/$NO_2$ electrochemical cell at a current density of 2 $mA\cdot cm^{-2}$ with commercial Pt/C, CuO, FeO, CoO, NiO and nano-NiO electrocatalysts. (FIG. 4*d*) XRD pattern of nano-NiO and the corresponding results of the Rietveld refinement. Refined parameters are space group: R-3m; a=2.97 Å; c=7.27 Å. (FIG. 4*e*) TEM image of nano-NiO. The inset is the corresponding SEAD pattern.

Figure 5:
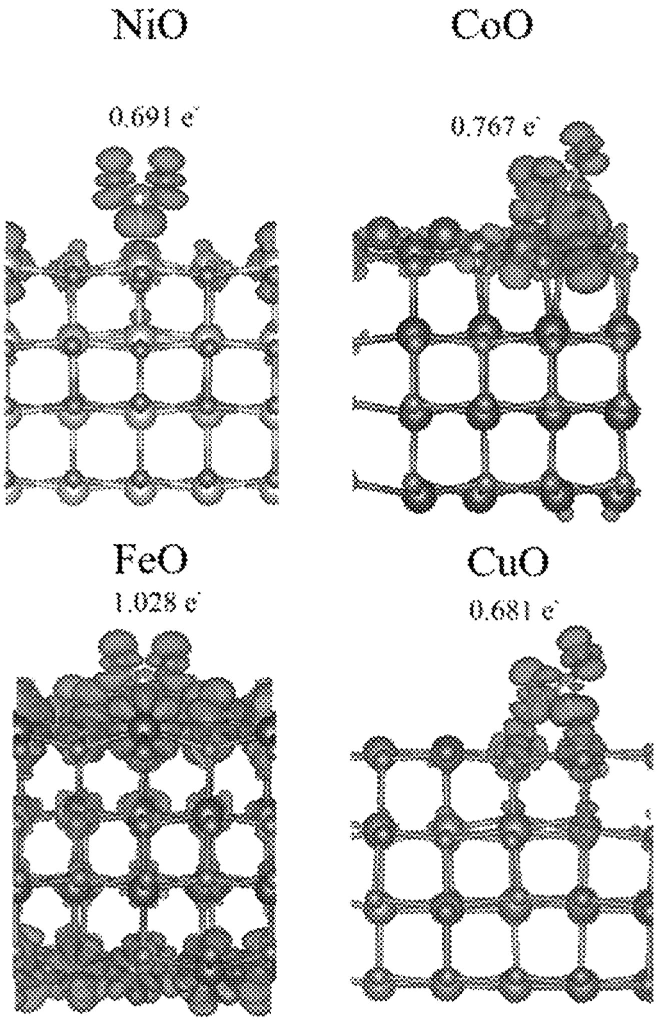
FIG. 5 shows the charge density difference distribution (CDDD) of adsorbed $*NO_2$ on NiO, CoO, FeO, and CuO with the isosurface value of 0.005 e $Bohr^{-3}$.

FIG. 5 shows the charge density difference distribution (CDDD) of adsorbed $*NO_2$ on NiO, CoO, FeO, and CuO with the isosurface value of 0.005 e $Bohr^{-3}$. The charge transfers from NiO, CoO, FeO, and CuO surface to $*NO_2$.

Figure 4A:
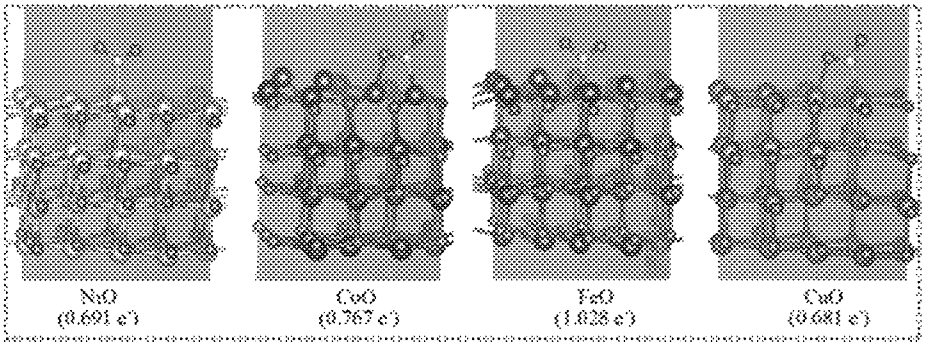
FIG. 4*a* shows 2D contour plot of CDDD of adsorbed $*NO_2$ on NiO, CoO, FeO and CuO.

The results in FIG. 4*a* and FIG. 5 showed a clear two-way charge transfer between metal oxides and $NO_2$, with charge accumulated in the top/bottom regions of O atoms and around metal-N/metal-O bonds, while charge depletion existed around the O atoms. Bader charge analysis indicated that NiO exhibited a relatively smaller charge transfer value from the surface to $*NO_2$ (0.691 $e^-$), in line with the charge density difference distribution results. Therefore, $NO_2$ was weakly trapped on the surface, which facilitated the desorption and two-way $NO_2^-$↔$*NO_2$ conversion.

Figure 4B:
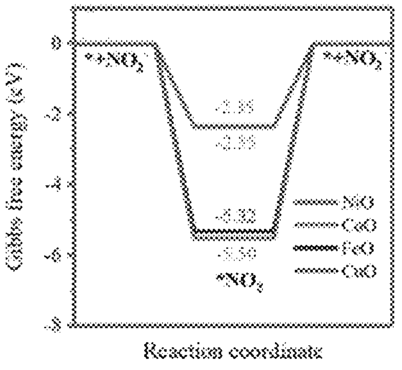
FIG. 4*b* shows Gibbs free energy diagrams for $NO_2^- \leftrightarrow NO_2$ conversion on NiO, CoO, FeO, and CuO surface.

In addition, Gibbs free energy diagrams presented in FIG. 4*b* indicated that the conversion from $*+NO_2^-$ to $*NO_2$ was energetically favorable, therefore the overall reaction thermodynamics were limited by the $NO_2$ desorption. The results showed that both NiO and CoO exhibited a desorption Gibbs free energy change of 2.35 eV, which was considerably smaller than that for FeO (5.32 eV) and CuO (5.50 eV). These results indicated that NiO had the best performance in catalyzing the $NO_2^-$↔$*NO_2$ conversion.

$NO_2$RR stands for "$NO_2$ Reduction Reaction." It is an abbreviation commonly used in the fields of chemistry and electrochemistry, referring to the chemical reaction that converts nitrogen dioxide ($NO_2$) into other compounds or products. To deliver a highly efficient conversion, electrocatalyst with high activity and selectivity for $NO_2$RR are a prerequisite. In general, the $NO_2$RR polarization curve exhibits similar features to those of the hydrogen evolution reaction (HER), including an onset potential and overpotential. In one embodiment, the electrocatalytic activities of $NO_2$RR were examined using three-electrodes configuration, in which the catalysts-deposition carbon fiber cloth (CFC) serves as the working electrode, Pt foil as counter electrode, and Ag/AgCl as the reference electrode. Excess $NO_2$ was blown through a gas pump towards the CFC electrode.

FIG. 6 depicts the (FIG. 6*a*) $NO_2$ reduction reaction polarization curves of the commercial Pt/C, CuO, FeO, CoO, NiO and nano-NiO electrodes at a scan rate of 5

$mV \cdot s^{-1}$ in 2M $ZnCl_2$ aqueous solution and (FIG. 6*b*) corresponding Tafel plots of these catalysts. (FIG. 6*c*) $NO_2$ reduction reaction polarization curves of the nano-NiO electrodes at 5 $mV \cdot s^{-1}$ in 2M $Zn(OTf)_2$, 2M $ZnSO_4$, 6M KOH and 2M $ZnCl_2$ aqueous solutions and (FIG. 6*d*) corresponding Tafel plots. (FIG. 6*e*) SEM images of nano-NiO.

Figure 6A:
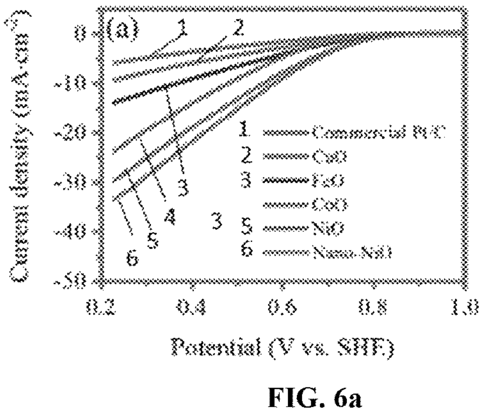
FIG. 6*a* shows $NO_2$ reduction reaction polarization curves of the commercial Pt/C, CuO, FeO, CoO, NiO and nano-NiO electrodes at a scan rate of 5 $mV \cdot s^{-1}$ in 2M $ZnCl_2$ aqueous solution.
Figure 6B:
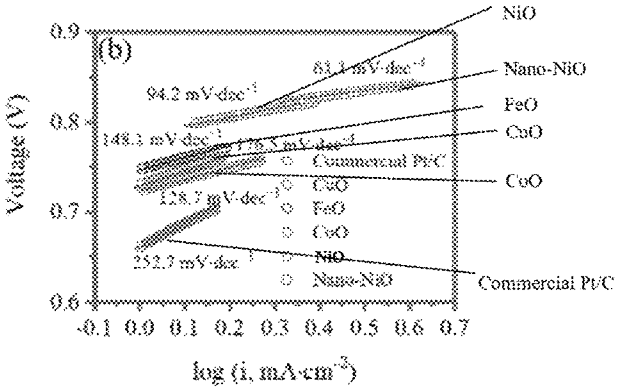
FIG. 6*b* shows corresponding Tafel plots of these catalysts.

Referring to FIG. 6*a*, the electrocatalytic performance of nano-NiO (420 mV for overpotential at 10 $mA \cdot cm^{-2}$) remarkably outperforms commercial Pt/C, CuO, FeO, CoO and NiO catalysts in 2M $ZnCl_2$ aqueous solution. Meanwhile, the nano-NiO catalyst exhibited lowest Tafel slope (61.1 $mV \cdot dec^{-1}$) (FIG. 6*b*), suggesting the superiority of nano-NiO for $NO_2RR$.

Figure 6C:
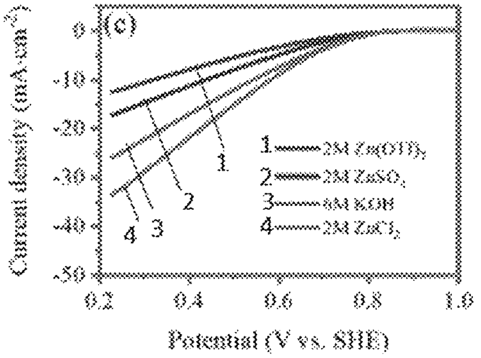
FIG. 6*c* shows $NO_2$ reduction reaction polarization curves of the nano-NiO electrodes at 5 $mV \cdot s^{-1}$ in different aqueous solutions.
Figure 6D:
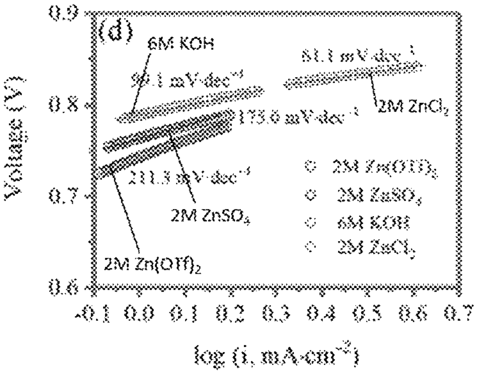
FIG. 6*d* shows corresponding Tafel plots.

Additionally, the $NO_2RR$ behaviors of nano-NiO were examine in different electrolytes, including 2M $Zn(OTf)_2$, $ZnSO_4$, 6M KOH and 2M $ZnCl_2$ aqueous solutions. As shown in FIGS. 6*c*-6*d*, it exhibited both lowest overpotential and Tafel slope in 2M $ZnCl_2$ aqueous solutions, demonstrating the suitability of $ZnCl_2$ aqueous electrolyte for $NO_2RR$.

Figure 4C:
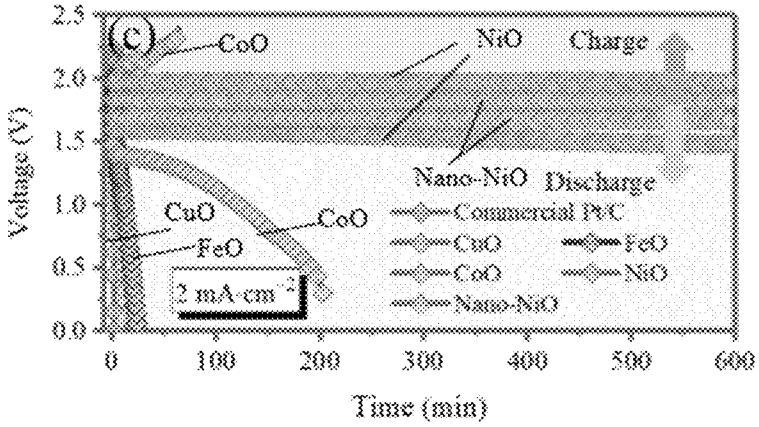
FIG. 4*c* shows the galvanostatic charge/discharge curves of the Zn/$NO_2$ electrochemical cell at a current density of 2 $mA \cdot cm^{-2}$ with commercial Pt/C, CuO, FeO, CoO, NiO and nano-NiO electrocatalysts.
Figure 4D:
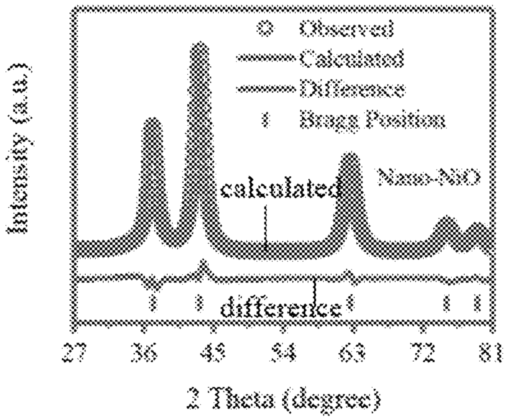
FIG. 4*d* shows XRD pattern of nano-NiO and the corresponding results of the Rietveld refinement.

In one embodiment, the Zn||$NO_2$ electrochemical cells were fabricated according to Example 3. As shown in FIG. 4*c*, when the batteries based on CuO, FeO, and commercial Pt/C electrocatalysts were charged or discharged, they exhibited a very large overpotential or experience a quick voltage drop to zero. This observation indicated a very sluggish electrocatalytic kinetic of Zn||$NO_2$ electrochemical cells using commercial CuO, FeO and Pt/C as catalysts. Although the CoO electrocatalyst enabled the Zn||$NO_2$ electrochemical cells to operate, the overpotential gradually increased during the charge/discharge processes. Encouragingly, NiO was particularly effective for catalyzing both the reductions of $NO_2$ and the oxidation of $NO_2^-$.

Nevertheless, the energy efficiency of the Zn||$NO_2$ cell was only 76.3%, and output voltage gradually decreased from 1.55 to 1.46 V after 600 min, indicating a gradually reduced electrocatalytic activity of NiO. Therefore, employing the nano-NiO electrocatalyst, the Zn||$NO_2$ electrochemical cells could steadily and continuously generate electric power while the $NO_2^-$ was efficiently oxidized.

The energy efficiency that was calculated by dividing the discharge voltage by the charging voltage, reached 92.6% when using the NiO nanoparticles (nano-NiO) electrocatalyst, which is much higher than that of the well-studied Zn-air batteries (<60%)[19-23]. The improved electrocatalytic activity was attributed to sufficient active sites and rapid transport of electrons and ions with nanostructuration of NiO electrocatalyst.

Example 5—Structure of Nano-NiO

To further enhance the catalytic efficiency of NiO, nano-NiO was fabricated via ultrasonic crushing method. The morphology and structure of the material were investigated using X-ray diffraction pattern (XRD), scanning electron microscopy (SEM) and transmission electron microscopy (TEM). The fabricated nano-NiO exhibited well-resolved but broader diffraction peaks with high intensity, indicating the presence of small crystallite sizes. The crystal structure was successfully refined with the space group of R-3m (FIG. 4*d*), which was similar to that of NiO.

Figure 4E:
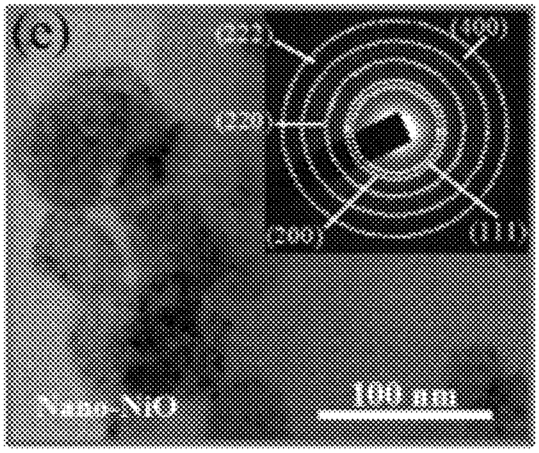
FIG. 4*e* shows TEM image of nano-NiO.
Figure 6E:
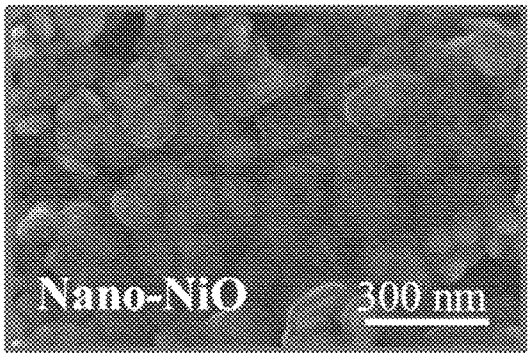
FIG. 6*e* shows SEM images of nano-NiO.

The representative SEM image exhibited a uniformly well-defined bean pod-shaped structure with a diameter of approximately 100 nm (FIG. 6*e*). The TEM image depicted a dense bean pod-like structure, and the corresponding selected area electron diffraction (SAED) confirmed further its polycrystalline characteristics (FIG. 4*e*).

Example 6—Electrochemical Performances of Zn||$NO_2$ Electrochemical Cell

Electrochemical performance of the Zn||$NO_2$ cells utilizing nano-NiO was investigated. The linear sweep voltammetry (LSV), open circuit voltage (OCV) and galvanostatic charge/discharge curves were conducted following the protocols well developed by Zn-air battery community.

FIG. 7 depicts the Zn||$NO_2$ electrochemical cell with NiO and nano-NiO catalysts: (FIG. 7*a*) Open circuit voltage over 50 h. (FIG. 7*b*) The discharged polarization profile and corresponding power densities curves at different densities. (FIG. 7*c*) Charge-discharge polarization profiles at different current densities. (FIG. 7*d*) Full discharged profiles recorded at different current densities of 0.2, 1, 5, 10 $mA \cdot cm^{-2}$. (FIG. 7*e*) Cycling performance testing at 2 $mA \cdot cm^{-2}$ using nano-NiO catalyst.

Figure 7A:
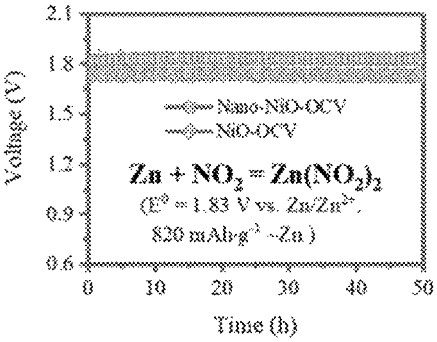
FIG. 7*a* depicts open circuit voltage of the Zn||$NO_2$ electrochemical cell with NiO and nano-NiO catalysts over 50 h.
Figure 7B:
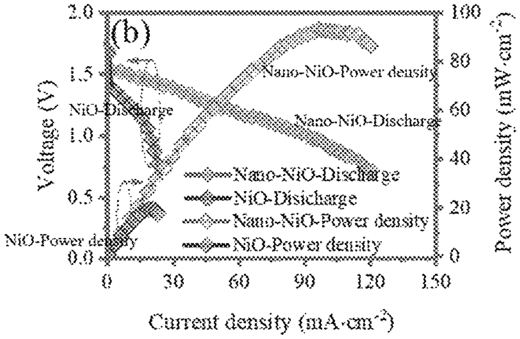
FIG. 7*b* depicts the discharged polarization profile and corresponding power densities curves at different densities.
Figure 7C:
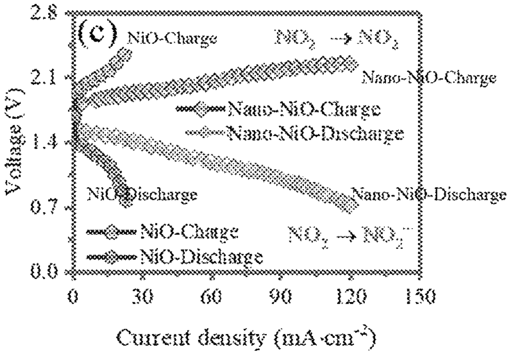
FIG. 7*c* depicts charge-discharge polarization profiles at different current densities.

As shown in FIG. 7*a*, the device equipped with the nano-NiO electrocatalyst exhibited a high open-circuit voltage (OCV) of 1.83 V under a $NO_2$ atmosphere, which was close to the theoretical value of 1.85 V. This OCV was higher compared to the device using the commercial NiO electrocatalyst (1.75 V). As shown in FIG. 7*b*, the peak power densities of the Zn||$NO_2$ electrochemical cells employing the NiO and nano-NiO reached 20.1 and 90.5 $mW \cdot cm^{-2}$, respectively, validating the superior $NO_2RR$ kinetics of nano-NiO. The symmetric charge/discharge curves in FIG. 7*c* indicated the bifunctional electrocatalysis of nano-NiO for $NO_2RR$ and $NO_2^-$ oxidation, surpassing the counterpart values of the NiO-based cells.

Figure 7D:
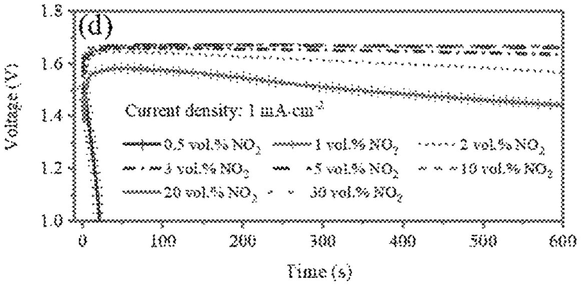
FIG. 7*d* depicts full discharged profiles recorded at different current densities of 0.2, 1, 5, 10 $mA \cdot cm^{-2}$.
Figure 7E:
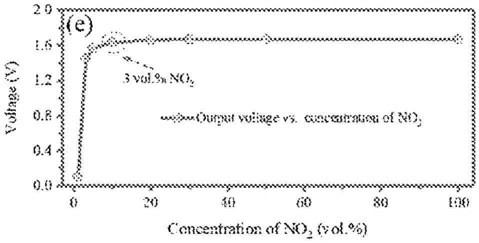
FIG. 7*e* depicts cycling performance testing at 2 $mA \cdot cm^{-2}$ using nano-NiO catalyst.

For the imitation of the practical application of the design of the present invention, the Zn||$NO_2$ electrochemical cells employing different concentrations of $NO_2$ gas were studied. It was noted that a mixture of $NO_2$/air was used to simulate the contaminated gas by $NO_2$. As shown in FIGS. 7*d*-7*e*, for an $NO_2$ gas content was below 3 vol. %, the $NO_2$ gas was depleted during the discharged process. However, the Zn||$NO_2$ electrochemical cells were able to steadily and continuously work when exposed to >3 vol. % $NO_2$ gas diffusion. Therefore, all subsequent experiments were conducted under the condition of 3 vol. % $NO_2$ gas.

Figure 7F:
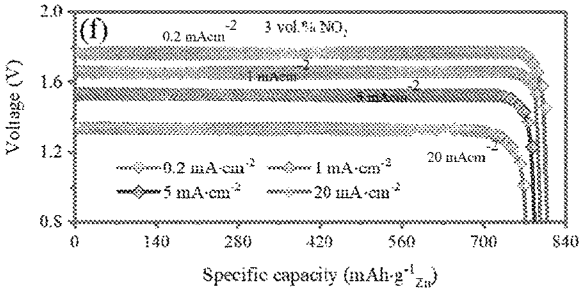
FIG. 7*f* depicts the discharge curves of Zn||$NO_2$ electrochemical cells at different discharge current densities.
Figure 8:
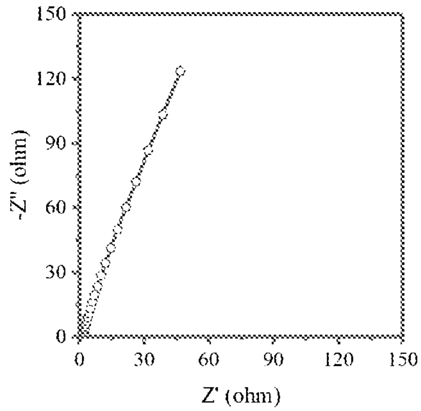
FIG. 8 depicts the AC impedance to examine ionic conductivity of 2M $ZnCl_2$ aqueous electrolyte.

Referring to FIG. 7*f*, the discharge curves of Zn||$NO_2$ electrochemical cells at different discharge current densities were shown. The battery delivered a high specific capacity of 820 $mAh \cdot g^{-1}$ with an output voltage of 1.79 V at 0.2 $mA \cdot cm^{-2}$. When the current increased up to 20 $mA \cdot cm^{-2}$, the battery could deliver a high capacity of 753 $mAh \cdot g^{-1}$ with 91.8% capacity retention, manifesting an excellent rate capability. The excellent rate capability originates from fast $NO_2RR$ kinetics and high ionic conductivity of aqueous electrolyte (47.65 $mS \cdot cm^{-1}$) (FIG. 8).

Figure 9:
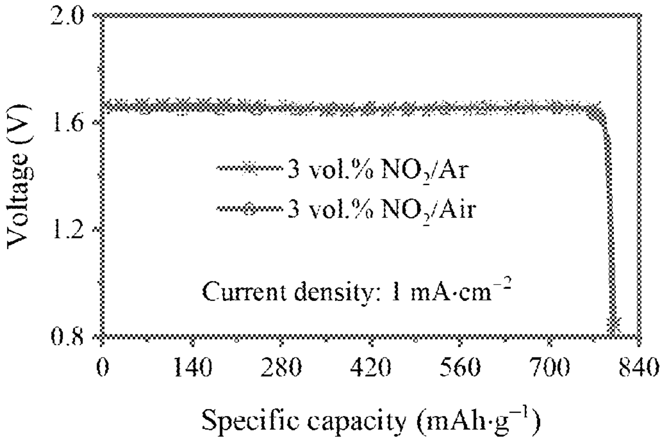
FIG. 9 depicts full discharged profiles recorded at current densities of 1 $mA \cdot cm^{-2}$ with 3 vol. % $NO_2$/Ar and 3 vol. % $NO_2$/Air diffused.

In order to exclude the participation of air, the present invention further investigated the discharge voltage profile of Zn||$NO_2$ cell at 1 $mA \cdot cm^2$ with 3 vol. % $NO_2$/Ar diffused (FIG. 9). It was observed that their electrochemical behavior was nearly identical, suggesting that only nitrogen dioxide is involved in the electrochemical reaction.

Figure 7G:
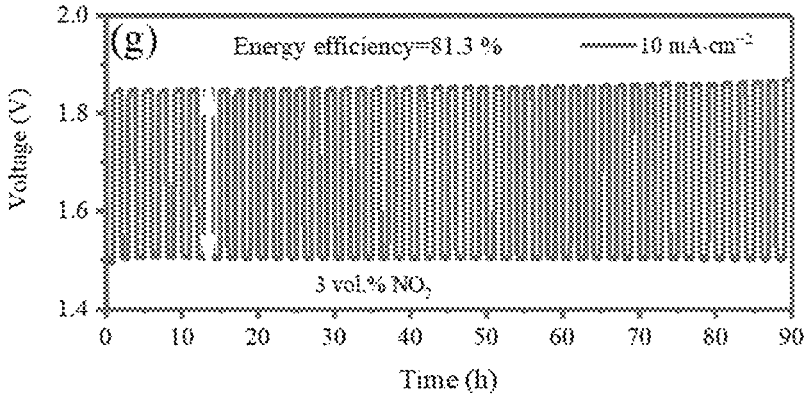
FIG. 7*g* depicts Energy efficiency of the Zn||$NO_2$ electrochemical cell with 3 vol. % $NO_2$ at 10 $mA \cdot cm^2$.
Figure 10:
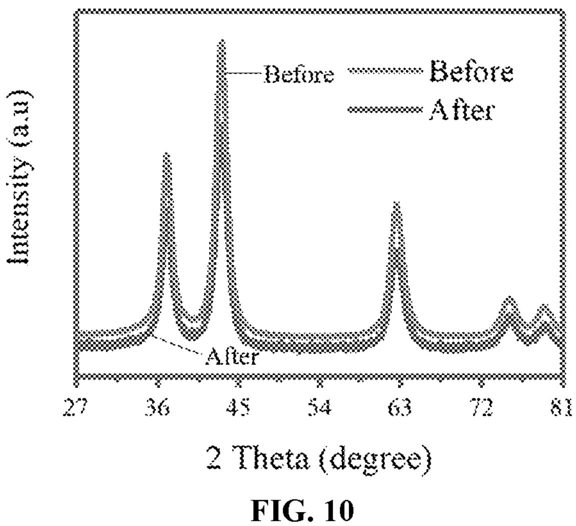
FIG. 10 depicts the XRD patterns of nano-NiO before and after cyclic test.

Long-term galvanostatic voltage profiles were recorded at an absolute current density of 10 $mA \cdot cm^{-2}$ with a time span of 1 h for each charging and discharging step. In FIG. 7*g*, there is almost no polarization increased over 90 h and the phase composition of nano-NiO remains unchanged (FIG. 10), validating the stable nano-NiO electrocatalyst in the aqueous system and the high reversibility of the gas diffusion cathode based on the $NO_2/NO_2^-$ redox reaction.

Figure 11:
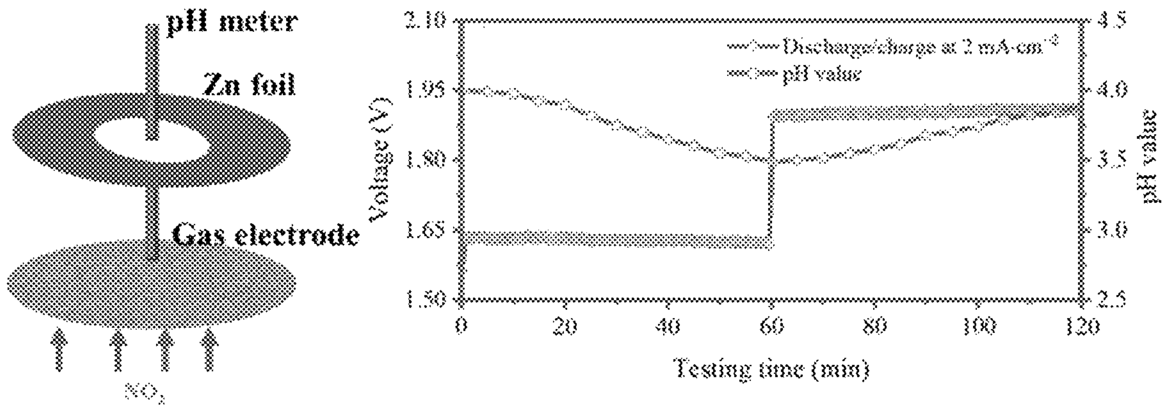
FIG. 11 depicts the home-made operando pH detection configuration, and discharge-charge curves of first cycle recorded at 2 $mA \cdot cm^{-2}$ over 2 h for one cycle, and corresponding discharged/charged times dependence of pH changes during cycling.

Furthermore, the changes of pH value are investigated by a home-made operando pH detection configuration (FIG. 11, left side). The pH value near the gas electrode gradually decreases from 3.96 to 3.49 during discharge process and is followed by a progressive increase to 3.89 at charged state (FIG. 11, right side), demonstrating a reversible pH change during the discharge/charge process and thus promoting the cyclic stability.

Figure 12A:
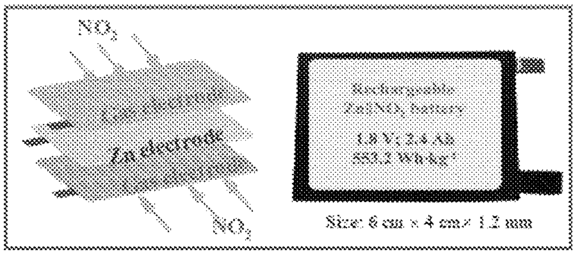
FIG. 12*a* shows schematic illustration of rechargeable aqueous Zn||$NO_2$ pouch cell with cathode-anode-cathode stack structure and an optical photograph of rechargeable aqueous Zn||$NO_2$ pouch cell.

Example 7—A 553.2 $Wh\cdot Kg^{-1}_{cell}$, 2.4 Ah-Scale Pouch-Type Zn||$NO_2$ Cells FIG. 12 depicts schematic illustration of rechargeable aqueous Zn||$NO_2$ pouch cell with cathode-anode-cathode stack structure (FIG. 12*a*). A optical photograph of rechargeable aqueous Zn||$NO_2$ pouch cell. (FIG. 12*b*) The delivered cell capacities of $NO_2$||Zn||$NO_2$ cells at different rates of 0.2 and 5 $mA\cdot cm^{-2}$. (FIG. 12*c*) Ragone plots for projected cell-level specific ($Wh\cdot kg^{-1}_{(cell)}$) and volumetric ($Wh\cdot L^{-1}$) energy densities with representative commercial and reported batteries. (FIG. 12*d*) Galvanostatic cyclic charge/discharge performance of $NO_2$||Zn||$NO_2$ cell at a current density of 5 $mA\cdot cm^{-2}$.

The Ah-scale Zn||$NO_2$ cells within a more practical system assembled with a metallic Zn anode was fabricated using a symmetric configuration, wherein cathodes and electrolytes were positioned on both sides of a metallic Zn anode, as illustrated in FIG. 12*a*.

Figure 12B:
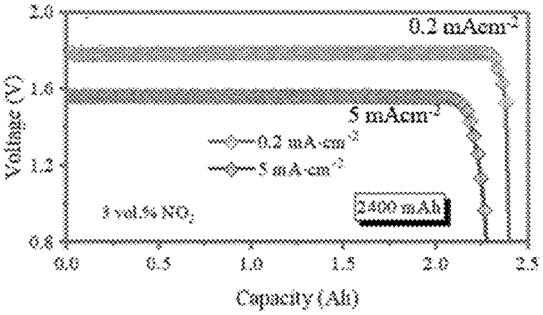
FIG. 12*b* shows the delivered cell capacities of $NO_2$||Zn||$NO_2$ cells at different rates of 0.2 and 5 $mA \cdot cm^{-2}$.
Figure 13:
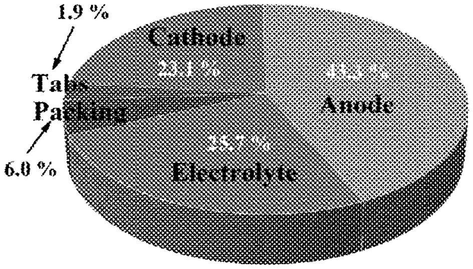
FIG. 13 shows a pie chart depicting the optimal weight distribution in cell component at 553.2 $Wh \cdot kg^{-1}{}_{(cell)}$ specific energy.

The full-cell system could provide an output energy density of 553.2 $Wh\cdot kg^{-1}_{cell}$ during discharging (calculated based on the mass of total loaded materials on both electrodes, electrolyte, and package, illustrated in the pie chart in FIG. 13). The cell-level discharge capacity of 333.3 $mAh\cdot g^{-1}_{cell}$ at the current density of 0.2 $mA\cdot cm^{-2}$ was recorded with a nominal cell voltage of 1.78 V using ~2.4 Ah full cells (FIG. 12*b*). No obvious potential drop was observed in the galvanostatic discharging at different current densities (0.2 and 5 $mA\cdot cm^{-2}$) until the Zn plate was exhausted or broken, indicating good stability in the $NO_2$RR test.

Figure 12C:
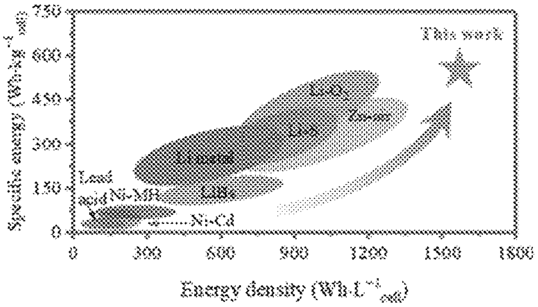
FIG. 12*c* shows Ragone plots for projected cell-level specific ($Wh \cdot kg^{-1}{}_{(cell)}$) and volumetric ($Wh \cdot L^{-1}$) energy densities with representative commercial and reported batteries.
Figure 12D:
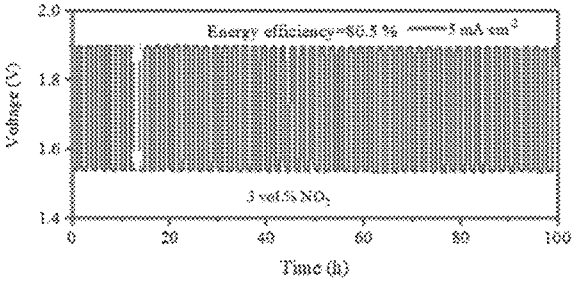
FIG. 12*d* shows galvanostatic cyclic charge/discharge performance of $NO_2$||Zn||$NO_2$ cell at a current density of 5 $mA \cdot cm^{-2}$.

Under realistic conditions, considering all active and inactive components, the Ah-scale Zn||$NO_2$ cell achieved groundbreaking cell-level specific and volumetric energy densities of 553.2 $Wh\cdot kg^{-1}_{cell}$ and 1589.6 $Wh\cdot L^{-1}$, respectively, based on all active and non-active materials. These values represent the highest cell energy densities ever reported among commercial Li-ion batteries, Zn-ion batteries and other advanced batteries[24-29] (FIG. 12*c*). Note that the Ah-scale Zn||$NO_2$ cells demonstrated cycling stability over 100 h at a current density of 5 $mA\cdot cm^{-2}$ (charge/discharge time of 1 h), and the energy efficiency reaches 80.5%, which is better than all reported Zn-air batteries[29-31, 33, 40, 41] (FIG. 12*d*).

Figure 14A:
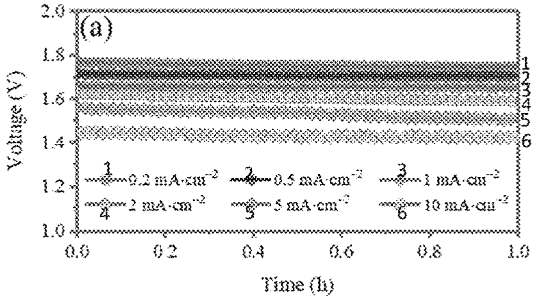
FIG. 14*a* depicts the galvanostatic discharge profile of a Zn||$NO_2$ electrochemical cell at different current density.
Figure 14B:
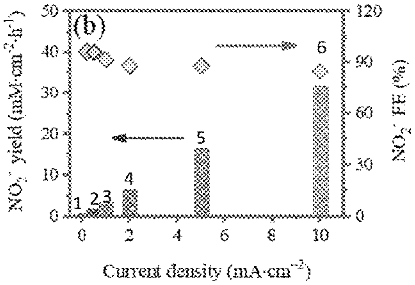
FIG. 14*b* depicts corresponding $NO_2^-$ species yield rates and faradaic efficiencies (FE).

Another application of the Zn||$NO_2$ cells is the production of value-added $NO_2^-$, which can be further converted to $NH_3$. FIG. 14 shows (FIG. 14*a*) the galvanostatic discharge profile of a Zn||$NO_2$ electrochemical cell at different current density of 0.2, 0.5, 1, 2, 5, 10 $mA\cdot cm^{-2}$. The length of the black arrows represents 2 V. (FIG. 14*b*) Corresponding $NO_2$ species yield rates and faradaic efficiencies (FE). (FIG. 14*c*) The galvanostatic discharged profile of a Zn||$NO_2$ electrochemical cell over different discharging time of 1, 2, 4, 6 h at 2 $mA\cdot cm^{-2}$ and (FIG. 14*d*) corresponding $NO_2^-$ species yield rates and FE. (FIG. 14*e*) Discharge-charge curves of first, second and third cycles recorded at 2 $mA\cdot cm^{-2}$ over 2 h for one cycle. (FIG. 14*e*, bottom) Discharged/charged times dependence of the $NO_2^-$, $NO_3^-$, $NO_2$, NO, $O_2$ yield during cycling. Galvanostatic measurements were conducted to electrochemically produce $NO_2^-$ at different current density for 1 h (FIG. 14*a*). The quantity of produced $NO_2^-$ was indirectly determined by chromogenic reaction method coupled with UV-vis absorption, and the standard calibration curve was shown in FIGS. 15*a*-15*b*.

Figure 14C:
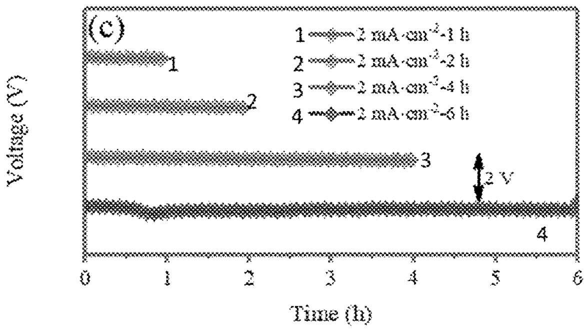
FIG. 14*c* depicts the galvanostatic discharged profile of a Zn||$NO_2$ electrochemical cell over different discharging time.
Figure 14D:
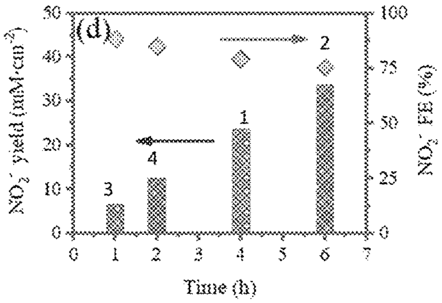
FIG. 14*d* depicts corresponding $NO_2$ species yield rates and FE.
Figure 15A:
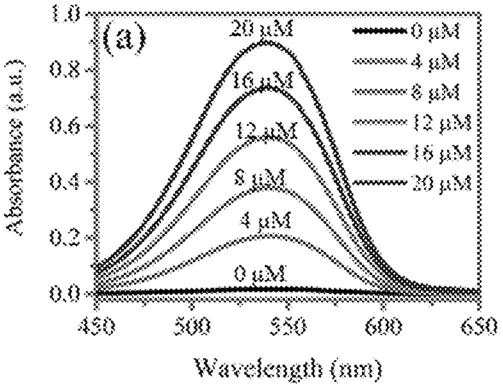
FIG. 15*a* depicts the UV-Vis absorption spectra and FIG. 15*b* depicts standard calibration curve for different concentrations of $NO_2^-$ ions.
Figure 15B:
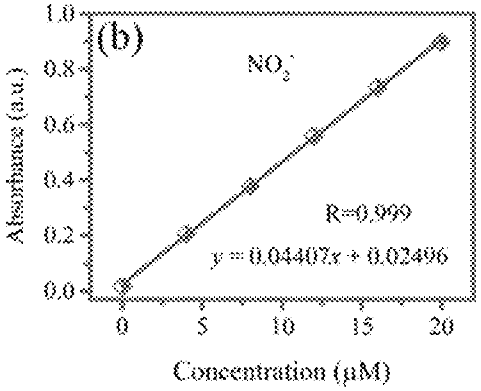
Figure 16A:
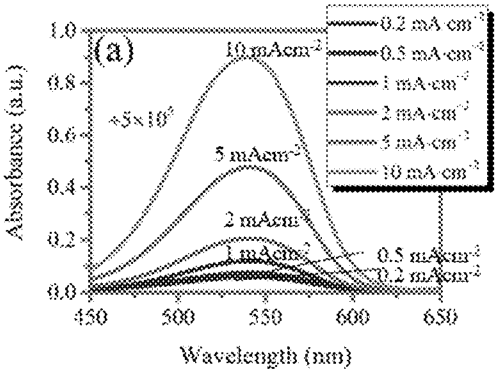
FIG. 16*a* depicts the UV-vis absorption spectra to determine the yield of $NO_2^-$ by aqueous Zn||$NO_2$ electrochemical cell at different current density, and FIG. 16*b* over different discharging time.
Figure 16B:
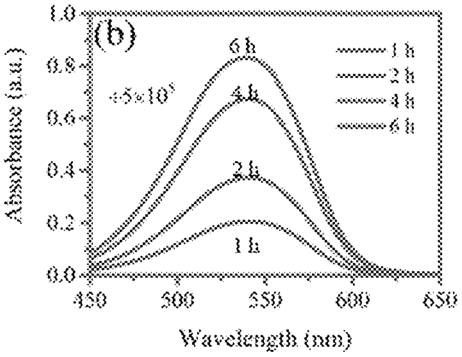

FIG. 16 depicts the UV-vis absorption spectra to determine the yield of $NO_2^-$ by aqueous Zn||$NO_2$ electrochemical cell (FIG. 16*a*) at different current density of 0.2, 0.5, 1, 2, 5, 10 $mA\cdot cm^{-2}$, and (FIG. 16*b*) over different discharging time of 1, 2, 4, 6 h at 2 $mA\cdot cm^2$. The UV-vis spectra of produced $NO_2^-$ with different discharge current were given in FIG. 16*a*, and the corresponding calculated yield of $NO_2^-$ was displayed in FIG. 14*b*. The yield of $NO_2^-$ reached 3.42 $mM\cdot cm^{-2}\cdot h^{-1}$ and the maximum Faraday efficiency (FE) was up to 96.4%. The yield of $NO_2^-$ showed an almost linear increase with respect to the discharging current. Similarly, extending the time for $NO_2^-$ evolution at a current density of 2 $mA\cdot cm^{-2}$, the yield of $NO_2^-$ also showed a linear increase (FIGS. 14*c*-14*d*, FIG. 16*b*). The above results indicate that the Zn||$NO_2$ cells can sustain efficient and continuous production of $NO_2$—. The slight reduction of FE can be ascribed to the buildup of $NO_2^-$ formed on the surface of the cathode, which reduces the number of catalytic active sites for absorbing $NO_2^-$. This deficiency can be solved by optimizing experimental device design, such as adopting a flow cell.

Figure 14E:
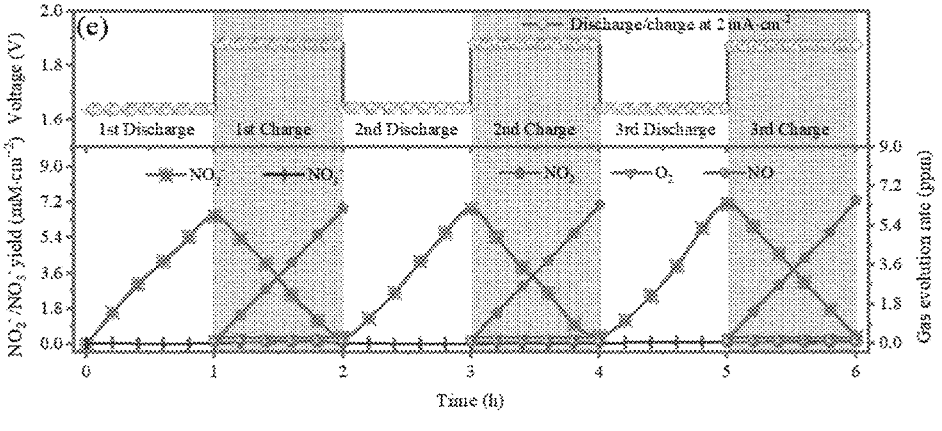
FIG. 14*e* depicts discharge-charge curves of first, second and third cycles recorded at 2 $mA \cdot cm^{-2}$ over 2 h for one cycle, and discharged/charged times dependence of the $NO_2^-$, $NO_3^-$, $NO_2$, NO, $O_2$ yield during cycling.
Figure 17:
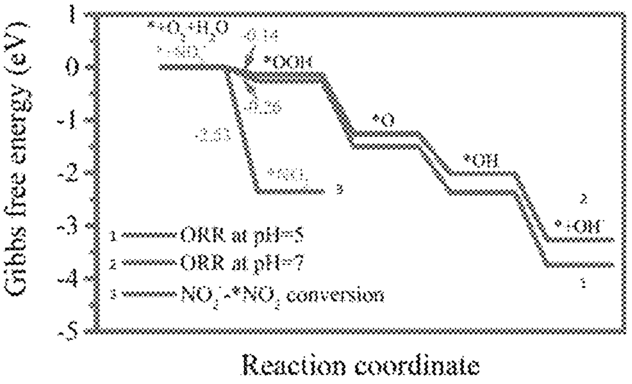
FIG. 17 depicts comparison of Gibbs free energy diagrams for $NO_2^-$—$*NO_2$ conversion and ORR (pH=5, 7) on NiO.

Characterizations were performed to assess the reversibility of the $NO_2/NO_2^-$ interconversion in a closed environment without oxygen/air, which was assumed for the rechargeable Zn||$NO_2$ battery system. More accurate quantitative information on both the charge/discharge components and gas evolution was investigated to further confirm the reaction mechanism and pathway in the Zn||(3 vol. % $NO_2$ in air) system. As shown in FIG. 14*e* during repeated cycling, the alternated increasing/decreasing and reversible variation trends of $NO_2$ and $NO_2^-$ clearly indicated the reversible interconversion of $NO_2 \leftrightarrow NO_2^-$. Besides, $NO_3^-$, NO and $O_2$ signals could not be observed, which suggested that there were no $NO_3^-/NO/O_2$ redox processes during the subsequent cycles. The Gibbs free energy change for $NO_2^- \leftrightarrow {}^*NO_2$ conversion and oxygen reduction reaction (ORR) at pH=5 and 7 on NiO were also compared. As depicted in FIG. 17, the $NO_2^- \leftrightarrow {}^*NO_2$ conversion was more favorable than the ORR at both pH values. Both experimental and theoretical results collectively validate that, despite the diffusion of the mixed $NO_2$/air gas to the cathode of the Zn||$NO_2$ electrochemical cell, no $O_2$/air is involved in the redox reactions during the charge and discharge processes.

Example 8—Structure Evolution of Nano-NiO Deposited Cathode During the $NO_2 \leftrightarrow NO_2^-$ Redox Process To unravel the structure evolution of the nano-NiO deposited cathode during the charge/discharge process, the ex-situ X-ray diffraction (XRD), X-ray photoelectron spectroscopy (XPS) and X-ray absorption near-edge spectroscopy (XANES) were performed.

Figure 18A:
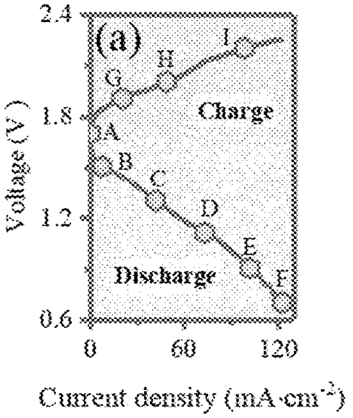
FIG. 18*a* depicts the charge/discharge curves of a Zn||$NO_2$ electrochemical cell.
Figure 18B:
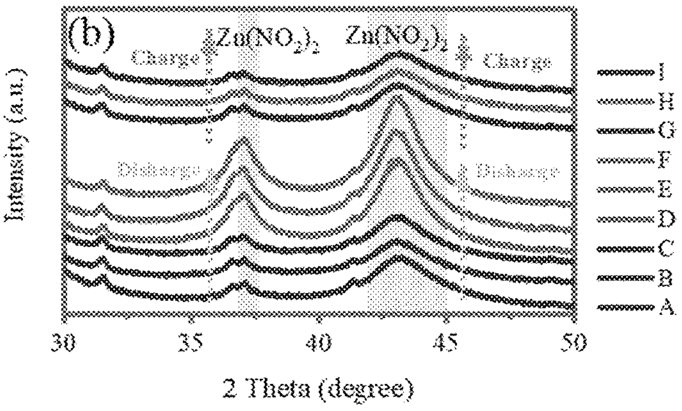
FIG. 18*b* depicts the corresponding ex-situ XRD patterns of NiO-deposited gas diffusion electrode.

As shown in FIGS. 18*a*-18*b*, the discharging process corresponded to $Zn^0$ losing electrons to form $Zn^{2+}$ ions, and the $Zn^{2+}$ first neutralized the absorbed $NO_2^-$ on the surface of cathode to form $Zn(NO_2)_2$. Then, $Zn(NO_2)_2$ was deposited on the surfaces of the nano-NiO-based gas diffusion electrode. During the charging process, deposited $Zn(NO_2)_2$ in the positive electrode was decomposed, which was confirmed by the absence of $Zn(NO_2)_2$ in X-ray diffraction (XRD).

Then, the chemistries of nano-NiO electrocatalysts were studied by ex-situ XANES and XPS. Changes in the local electronic and atomic structures of the Ni sites of NiO in the charge/discharge electrocatalytic cycle were monitored by X-ray absorption spectroscopy, including X-ray absorption near edge structure (XANES) and extended X-ray absorption fine structure (EXAFS) analysis. FIGS. 18*c*-18*f* summarized the Ni K-edge X-ray absorption spectra during electrochemical cycling, including the discharging process from 1.8 to 0.6 V and charging processes from 1.8 to 2.2 V, respectively.

Figure 18C:
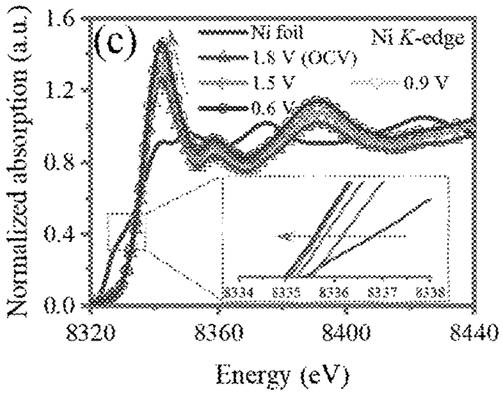
FIG. 18*c* depicts Ni K-edge XANES spectra.
Figure 18D:
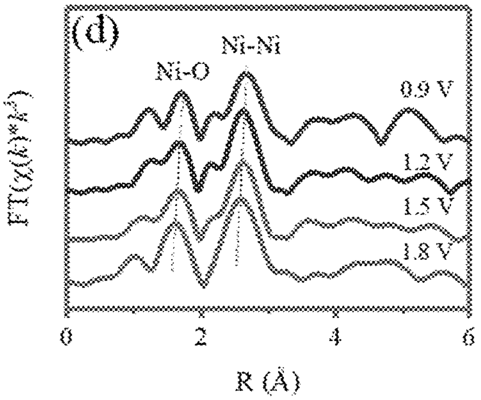
FIG. 18*d* depicts fourier-transformed EXAFS spectra collected at the Ni K-edge of nano-NiO composite obtained ex-situ at different discharged states.
Figure 18E:
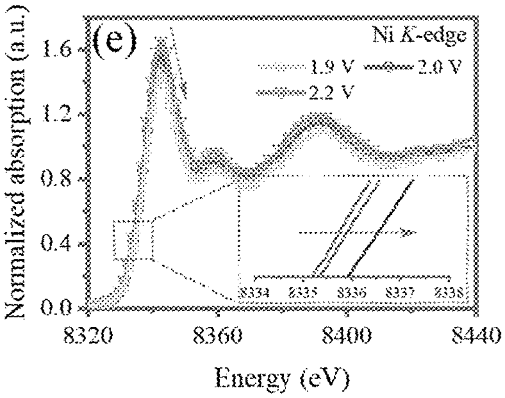
FIG. 18*e* depicts Ni K-edge XANES spectra and FIG. 18*f* depicts fourier-transformed EXAFS spectra collected at the Ni K-edge of nano-NiO composite obtained ex-situ at different charged states.
Figure 18F:
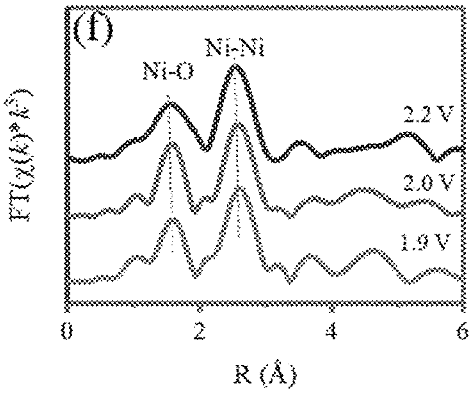
Figure 19A:
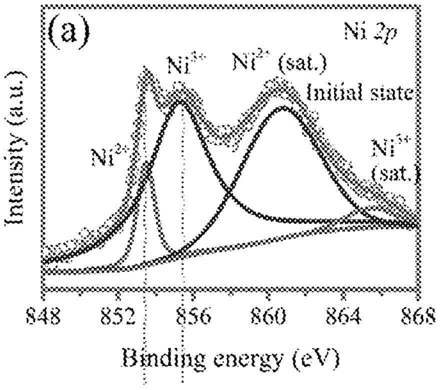
FIG. 19*a* and FIG. 19*b* depict high-resolution Ni 2p and O 1s spectra of nano-NiO at initial.
Figure 19B:
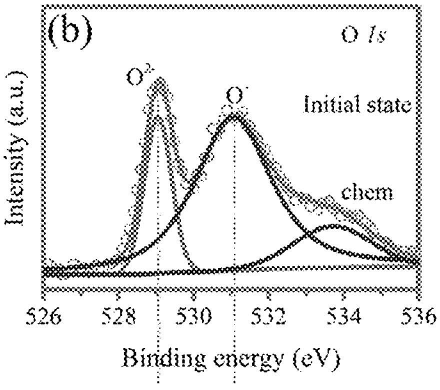
Figure 19C:
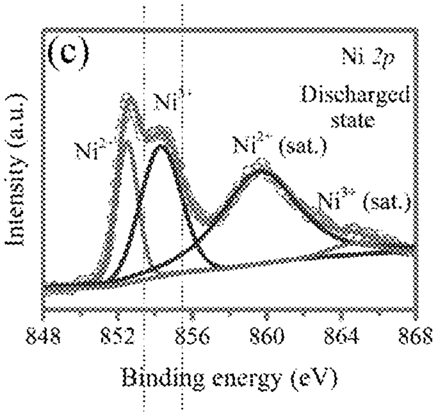
FIG. 19*c* and FIG. 19*d* depict the discharged states.
Figure 19D:
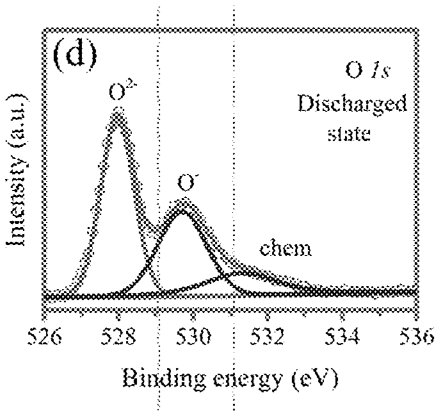
Figure 19E:
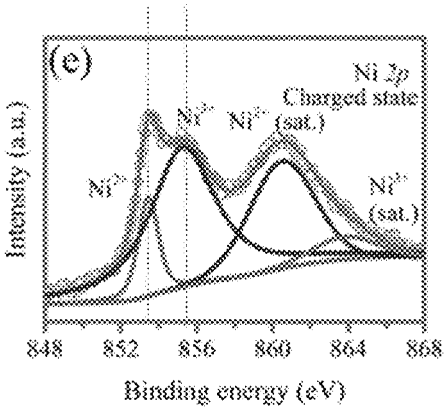
FIG. 19*e* and FIG. 19*f* depict the charged states.
Figure 19F:
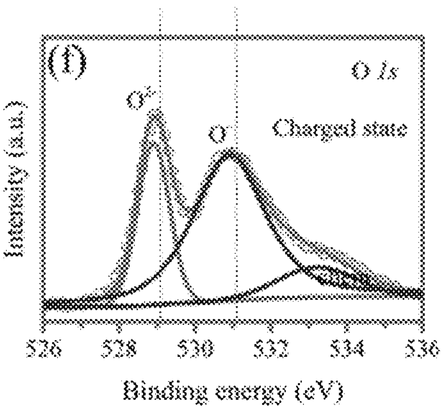

With discharging process (1.8-0.6 V), $H_2O$ was disassociated to $H_{ad}$ and $OH_{ad}$ by breaking H—OH bond and the absorbed $H_{ad}$ would combine with $NO_{2ad}$ to form $HNO_2$. The Ni K-edge XANES peaks gradually shifted to a lower energy compared with the sample at open-circuit voltage of 1.8 V, demonstrating a gradually decreased average valence state in NiO[30-31] (FIG. 18*c*). The results were in line with the XPS results that the Ni $2p_{3/2}$ peaks of NiO after discharging reaction shifts to lower energy, compared with that of pristine NiO (FIGS. 19*a*-19*f*). FIG. 19 depicts high-resolution Ni 2p and O 1s spectra of nano-NiO at (19*a*, 19*b*) initial, (19*c*, 19*d*) discharged and (19*e*, 19*f*) charged states. Ni 2p spectra at initial, discharged and charged states. O 1s spectra at initial, discharged and charged states. Correspondingly, the Fourier transform of the extended X-ray absorption fine structure (FT-EXAFS) of the interatomic Ni—O distance was enlarged from 1.59 Å to 1.69 Å at an OCV of 0.9 V (FIG. 18*d*), implying the reduction of Ni ion with the discharging process. While during charging process, the H—$NO_2^-$ was broken and dissociated to $H_{ad}$ and $NO_{2ad}$ on NiO surface. The disassociated $H_{ad}$ will occupy the exposed 0 site of NiO. The Ni K-edge XANES peaks reversibly shift back to higher energy with the charging process (1.9-2.2 V), indicating an increase in Ni oxidation state[32-33] (FIG. 18*e*). Accordingly, the interatomic Ni—O distance was reduced from 1.69 Å at 1.9 to 1.59 Å at 2.2 V (FIG. 7*f*). The above results support the reversible transitions of the Ni K-edge, manifesting symmetric $Ni^{2+/x+}$ (1<x<2) redox reactions.

Example 9—Self-Powered Haber-Bosch Reactor for $NH_3$ Production

Electrochemical nitrate reduction from $NO_2^-$ into $NH_3$ is promising for the future landscape of $NH_3$ electrosynthesis based on the following six-electron reaction:

$$NO_2^- + 7H^+ + 6e^- \rightarrow NH_3 + 2H_2O \quad (4)$$

On the other hand, water electrolysis is a modular alternative $H^+$ source by using a commercially available water splitting setup, based on the following four-electron reaction:

$$2H_2O - 4e^- \rightarrow O_2 + 4H^+ \quad (5)$$

Based on the above reactions of nitrate reduction and water oxidation, the present invention couples the two reactions in an electrochemical Haber-Bosch (eHB) reactor. This reactor produces $NH_3$ from $NO_2^-$ and $H^+$ under ambient conditions, involving only $NO_2$, $H_2O$, and renewable electrons in an overall reaction.

Figure 20A:
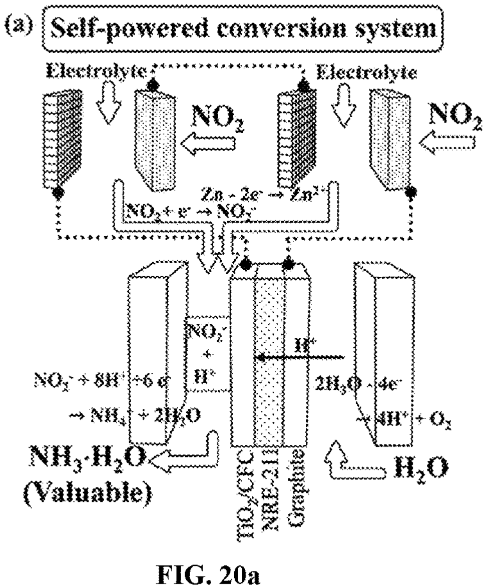
FIG. 20*a* depicts a schematic of two Zn||$NO_2$ electrochemical cells powered electrochemical Haber-Bosch reactor coupled to a water splitting reactor.
Figure 20B:
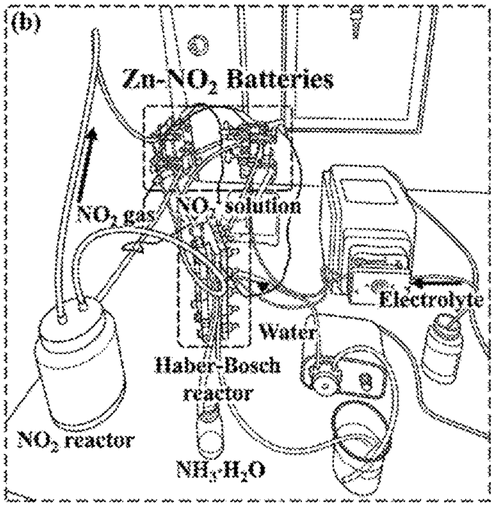
FIG. 20*b* shows the corresponding photograph depicting the model.

For improving electrocatalytic kinetics, an effective, cheap and low-toxicity catalyst of commercial nano-$TiO_2$ (P25) was employed in the electrocatalytic system for $NH_3$ synthesis. Schematic diagram and optical photo were depicted in FIGS. 20*a*-20*b*, respectively.

The eHB system with a dual-compartment electrocatalytic cell consists of a graphite bipolar plate, Nafion membrane (NRE-211), and a $TiO_2$/CFC electrode. The eHB reactor could be powered by two Zn||$NO_2$ cells connected in series to drive the subsequent electrocatalytic reduction for $NH_3$ synthesis. Noted that the generated $NO_2^-$ from Zn||$NO_2$ cells could directly flow into eHB reactor for further $NH_3$ production. Therefore, as long as keeping providing the electrolyte and $NO_2$ gas, the self-powered eHB could keep producing $NH_3$.

Figure 20C:
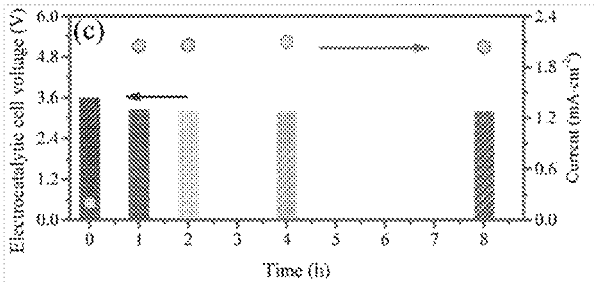
FIG. 20*c* depicts the voltage and current of electrochemical Haber-Bosch reactor.

FIG. 20*c* showed the voltage and output current of electrocatalytic cell. With the duration extended, the voltage maintains 3.0 V unchanged and the output current was about 2.1 $mA\cdot cm^{-2}$ over 8 h, demonstrating continuous and stable electrocatalytic reactions for $NH_3$ synthesis.

Figure 20D:
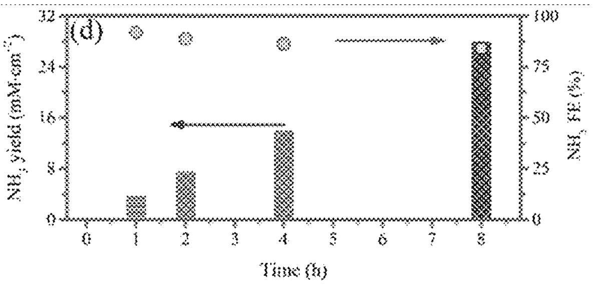
FIG. 20*d* depicts the $NH_3$—$H_2O$ yield rates and FE.
Figure 21A:
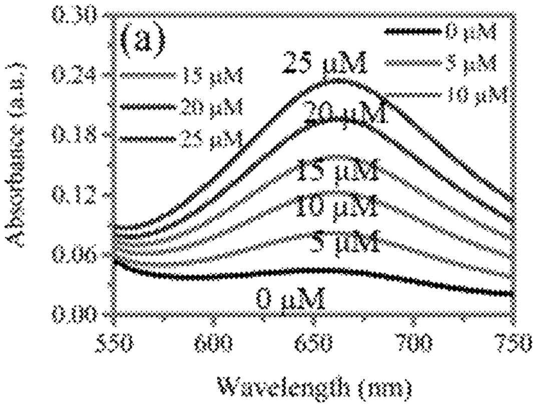
FIG. 21*a* depicts the UV-Vis absorption spectra and FIG. 21*b* depicts concentration-absorbance standard calibration curve using the indophenol blue method for different concentrations of $NH_4^+$ ions.
Figure 21B:
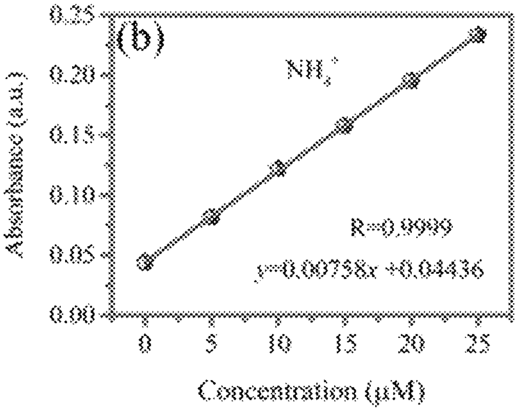
Figure 22:
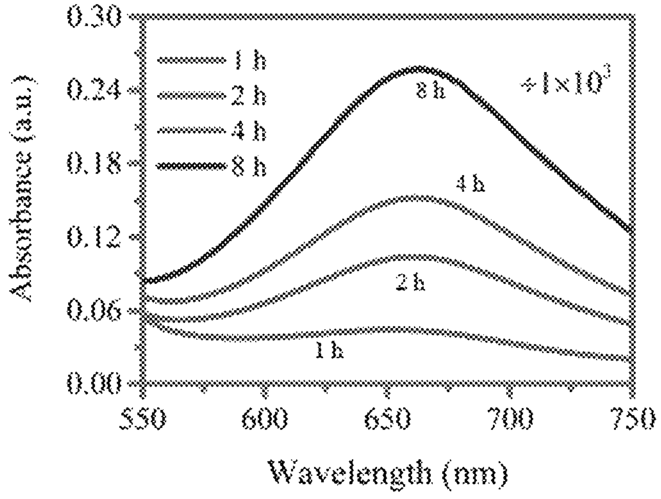
FIG. 22 depicts the UV-vis absorption spectra to determine the yield of $NH_4^+$ by self-power conversion system over different discharging time.

FIGS. 21*a*-21*b* depict the UV-Vis absorption spectra and concentration-absorbance standard calibration curve using the indophenol blue method for different concentrations of $NH_4^+$ ions. FIG. 22 depicts the UV-vis absorption spectra to determine the yield of $NH_4^+$ by self-power conversion system over different discharging time of 1, 2, 4, 8 h. After 1 h of reaction, $NH_3$ was successfully synthesized by the self-powered system. The determination results calculated according to UV-vis absorption (FIGS. 21-22), were shown in FIG. 20*d*. By measuring the solution volume involved in the cathode reaction, the self-powered $NH_3$ yield per hour achieved 4 $mM\cdot h^{-1}$. Therefore, it is feasible to reutilize the residual kinetic energy of the exhaust gas to drive the valuable $NH_3$ synthesis.

In summary, the present invention relates to an electrochemical cell of aqueous Zn||$NO_2$ battery system, which can efficiently capture and convert $NO_2$ to $NO_2$—, and to final value-added $NH_3$, together with simultaneously produce a significant amount of electric power. Preferably, the aqueous rechargeable Zn||$NO_2$ system has a 1.8 V discharge voltage based on reversible $NO_2^- \leftrightarrow NO_2$ conversion, and the energy efficiency reaches 81.3% with 3 vol. % $NO_2$/air diffused at 10 $mA\cdot cm^2$ (FIG. 7*g*). The assembled pouch-type 2.4 Ah-scale battery can deliver a high energy density of 553.2 $Wh\cdot kg^{-1}{}_{cell}$ and a high volumetric density of 1589.6 $Wh\cdot L^{-1}{}_{cell}$. to the system is capable of utilizing the $NO_2$ exhaust gas for ammonia synthesis, which is energy-saving and eco-friendly. The yield of the $NO_2^-$ ions reaches 3.42 $mM\cdot cm^{-2}\cdot h^{-1}$ and the Faradaic efficiency is about 96.4%.

The produced $NO_2^-$ can be further converted to $NH_3$ by a self-powered conversion system that consists of two Zn||$NO_2$ cell connected in series and an electrochemical Haber-Bosch reactor. This work opens a new avenue for $NO_2$ capture/conversion via reversible aqueous metal||$NO_2$ systems and eco-friendly conversion/storage devices.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

REFERENCES: THE DISCLOSURES OF THE FOLLOWING REFERENCES ARE INCORPORATED BY REFERENCE

1. Sadat, W. I. A.; Archer, L. A., *Sci. Adv.* 2016, 2 (7), e1600968.
2. Park, H.; Lim, H. D.; Lim, H. K.; Seong, W. M.; Moon, S.; Ko, Y.; Lee, B.; Bae, Y.; Kim, H.; Kang, K., *Nat. Commun.* 2017, 8 (1), 14989.
3. Li, J.; Wang, L.; Zhao, Y.; Li, S.; Fu, X.; Wang, B.; Peng, H., *Adv. Funct. Mater.* 2020, 30 (27), 2001619.
4. Xie, J.; Wang, X.; Lv, J.; Huang, Y.; Wu, M.; Wang, Y.; Yao, *J., Angew. Chem. Int. Ed.* 2018, 57 (52), 16996.
5. Wang, X.; Xie, J.; Ghausi, M. A.; Lv, J.; Huang, Y.; Wu, M.; Wang, Y.; Yao, J., *Adv. Mater.* 2019, 31 (17), 1807807.
6. Ahmad, T.; Liu, S.; Sajid, M.; Li, K.; Ali, M.; Liu, L.; Chen, W., *Nano Res. Energy* 2022, 1, e9120021.
7. Liang, J.; Zhang, C.; Liu, D.; Wu, T.; Tao, Y.; Ling, G.-W.; Yu, H.-J.; Lu, J.; Yang, Q.-H., Room-temperature reduction of NO2 in a Li—NO2 battery: a proof of concept. *Science Bulletin* 2020, 65 (1), 55.
8. Bae, S. W.; Roh, S. A.; Kim, S. D., *Chemosphere* 2006, 65 (1), 170.
9. Pappas, D. K.; Boningari, T.; Boolchand, P.; Smirniotis, P. G., *J. Catal.* 2016, 334, 1.

ADDIN EN.REFLIST 10. Kresse, G.; Furthmüller, J., Efficient iterative schemes for ab initio total-energy calculations using a plane-wave basis set. *Phys. Rev. B* 1996, 54 (16), 11169.

11. Kresse, G.; Joubert, D., From ultrasoft pseudopotentials to the projector augmented-wave method. *Phys. Rev. B* 1999, 59 (3), 1758.
12. Perdew, J. P.; Burke, K.; Ernzerhof, M., Generalized gradient approximation made simple. *Phys. Rev. Lett.* 1996, 77 (18), 3865.
13. Grimme, S.; Antony, J.; Ehrlich, S.; Krieg, H., A consistent and accurate ab initio parametrization of density functional dispersion correction (DFT-D) for the 94 elements H—Pu. *J. Chem. Phys.* 2010, 132 (15), 154104.
14. Grimme, S.; Ehrlich, S.; Goerigk, L., Effect of the damping function in dispersion corrected density functional theory. *J. Comput. Chem.* 2011, 32 (7), 1456-1465.
15. Jain, A.; Ong, S. P.; Hautier, G.; Chen, W.; Richards, W. D.; Dacek, S.; Cholia, S.; Gunter, D.; Skinner, D.; Ceder, G.; Persson, K. A., Commentary: The Materials Project: A materials genome approach to accelerating materials innovation. *APL Materials* 2013, 1 (1), 011002.
16. Himmetoglu, B.; Wentzcovitch, R. M.; Cococcioni, M., First-principles study of electronic and structural properties of CuO. *Phys. Rev. B* 2011, 84 (11), 115108.
17. Tang, W.; Sanville, E.; Henkelman, G., A grid-based Bader analysis algorithm without lattice bias. *J. Phys.: Condens. Matter* 2009, 21 (8), 084204.
18. Nørskov, J. K.; Rossmeisl, J.; Logadottir, A.; Lindqvist, L.; Kitchin, J. R.; Bligaard, T.; Jonsson, H., Origin of the overpotential for oxygen reduction at a fuel-cell cathode. *J. Phys. Chem. B* 2004, 108 (46), 17886-17892.
19. Ma, L.; Chen, S.; Pei, Z.; Huang, Y.; Liang, G.; Mo, F.; Yang, Q.; Su, J.; Gao, Y.; Zapien, J. A.; Zhi, C., *ACS Nano* 2018, 12 (2), 1949.
20. Chen, S.; Ma, L.; Wu, S.; Wang, S.; Li, Z.; Emmanuel, A. A.; Huqe, M. R.; Zhi, C.; Zapien, J. A., *Adv. Funct. Mater.* 2020, 30 (10), 1908945.
21. Sun, W.; Wang, F.; Zhang, B.; Zhang, M.; Kupers, V.; Ji, X.; Theile, C.; Bieker, P.; Xu, K.; Wang, C.; Winter, M., *Science* 2021, 371 (6524), 46.
22. Pan, J.; Xu, Y. Y.; Yang, H.; Dong, Z.; Liu, H.; Xia, B. Y., Adv. Sci. 2018, 5 (4), 1700691.
23. Shinde, S. S.; Jung, J. Y.; Wagh, N. K.; Lee, C. H.; Kim, D. H.; Kim, S. H.; Lee, S. U.; Lee, J. H., *Nat. Energy* 2021, 6 (6), 592.
24. Kim, J. H.; Lee, Y. H.; Cho, S J.; Gwon, J. G.; Cho, H. J.; Jang, M.; Lee, S. Y.; Lee, S. Y., *Energy Environ. Sci.* 2019, 12 (1), 177.
25. Ue, M.; Sakaushi, K.; Uosaki, K., *Mater. Horiz.* 2020, 7 (8), 1937.
26. Ma, L.; Li, N.; Long, C.; Dong, B.; Fang, D.; Liu, Z.; Zhao, Y.; Li, X.; Fan, J.; Chen, S.; Zhang, S.; Zhi, C., *Adv. Funct. Mater.* 2019, 29 (46), 1906142.
27. Cha, E.; Patel, M.; Bhoyate, S.; Prasad, V.; Choi, W., *Nanoscale Horiz.* 2020, 5 (5), 808-831.
28. Yuan, X.; Ma, F.; Zuo, L.; Wang, J.; Yu, N.; Chen, Y.; Zhu, Y.; Huang, Q.; Holze, R.; Wu, Y.; van Ree, T., *Electrochem.l Energy Rev.* 2021, 4 (1), 1.
29. Dühnen, S.; Betz, J.; Kolek, M.; Schmuch, R.; Winter, M.; Placke, T., *Small Methods* 2020, 4 (7), 2000039.
30. Jiang, J.; Sun, F.; Zhou, S.; Hu, W.; Zhang, H.; Dong, J.; Jiang, Z.; Zhao, J.; Li, J.; Yan, W.; Wang, M., *Nat. Commun.* 2018, 9 (1), 2885.
31. Zhao, S.; Tan, C.; He, C. T.; An, P.; Xie, F.; Jiang, S.; Zhu, Y.; Wu, K. H.; Zhang, B.; Li, H.; Zhang, J.; Chen, Y.; Liu, S.; Dong, J.; Tang, Z., *Nat. Energy* 2020, 5 (11), 881.
32. Chen, G. F.; Ma, T. Y.; Liu, Z. Q.; Li, N.; Su, Y. Z.; Davey, K.; Qiao, S. Z., *Adv. Funct. Mater.* 2016, 26 (19), 3314.

33. Doan, H.; Kendrick, I.; Blanchard, R.; Jia, Q.; Knecht, E.; Freeman, A.; Jankins, T.; Bates, M. K.; Mukerjee, S., *J. Electrochem. Soc.* 2021, 168 (8), 084501.

What is claimed is:

1. A rechargeable aqueous Zn||$NO_2$ cell comprising:

an anode;

a gas diffusion cathode formed by at least one nano NiO catalyst-deposited material and located under a gas source, wherein the nano-NiO catalyst exhibits an electrocatalytic performance of at least 350 mV for overpotential at 10 $mA \cdot cm^{-2}$, and the nano-NiO catalyst exhibits a Tafel slope lower than 65 $mV \cdot dec^{-1}$;

a separator placed between the gas diffusion cathode and the anode; and an electrolyte disposed in a space between the gas diffusion cathode and the anode, wherein the rechargeable aqueous Zn||$NO_2$ cell delivers a high specific capacity of at least 800 $mAh \cdot g^{-1}$ with an output voltage of 1.79 V at 0.2 $mA \cdot cm^{-2}$, and when the current increased up to 20 $mA \cdot cm^{-2}$, the rechargeable aqueous Zn||$NO_2$ cell delivers a high capacity of at least 700 $mAh \cdot g^{-1}$ with at least 90% capacity retention.

2. The rechargeable aqueous Zn||$NO_2$ cell of claim 1, wherein the anode comprises Zn foil or Zn plate.

3. The rechargeable aqueous Zn||$NO_2$ cell of claim 1, wherein the electrolyte comprises $ZnCl_2$ solution, $Zn(OTf)_2$ solution, $ZnSO_4$ solution, or KOH solution, or a combination thereof.

4. The rechargeable aqueous Zn||$NO_2$ cell of claim 1, wherein the separator comprises polypropylene/polyethylene/polypropylene (PP/PE/PP) separator, poly(tetrafluoroethylene) (PTFE), poly(vinyl chloride) (PVC) and polyamide (PA).

5. The rechargeable aqueous Zn||$NO_2$ cell of claim 1, wherein the at least one nano NiO catalyst-deposited material comprises carbon fiber cloth (CFC), a fluorocarbon-based polymer, or isopropanol.

6. The rechargeable aqueous Zn||$NO_2$ cell of claim 1, wherein a device having the nano NiO catalyst exhibits a high open circuit voltage (OCV) of at least 1.8 V under $NO_2$ atmosphere.

7. The rechargeable aqueous Zn||$NO_2$ cell of claim 1, wherein the rechargeable aqueous Zn||$NO_2$ cell has a peak power density of at least 80 $mW \cdot cm^{-2}$.

8. The rechargeable aqueous Zn||$NO_2$ cell of claim 1, wherein the gas source is $NO_2$.

9. The rechargeable aqueous Zn||$NO_2$ cell of claim 8, wherein the rechargeable aqueous Zn||$NO_2$ cell works with at least 3 vol. % $NO_2$ gas diffusing.

10. The rechargeable aqueous Zn||$NO_2$ cell of claim 1, wherein the gas diffusion cathode is based on the $NO_2/NO_2^-$ redox reaction.

11. The rechargeable aqueous Zn||$NO_2$ cell of claim 1, wherein the rechargeable aqueous Zn||$NO_2$ cell is of Ah-scale.

12. The rechargeable aqueous Zn||$NO_2$ cell of claim 1, wherein the rechargeable aqueous Zn||$NO_2$ cell delivers a high energy density of at least 553.2 $Wh \cdot kg^{-1}{}_{cell}$ and a high volumetric density of 1589.6 $Wh \cdot L^{-1}{}_{cell}$.

13. The rechargeable aqueous Zn||$NO_2$ cell of claim 1, wherein the rechargeable aqueous Zn||$NO_2$ cell demonstrates cycling stability over 100 h at a current density of 5 $mA \cdot cm^{-2}$ with a charge or discharge time of 1 h, and the energy efficiency reaches at least 80%.

14. A self-powered Haber-Bosch reactor for $NH_3$ production, comprising a graphite bipolar plate, an ion exchange membrane, a $TiO_2$/CFC electrode, and at least two rechargeable aqueous Zn||$NO_2$ cells of claim 1 connected in series to drive the subsequent electrocatalytic reduction for $NH_3$ synthesis.

15. The self-powered Haber-Bosch reactor of claim 14, wherein with the duration extended, the voltage maintains 3.0 V unchanged and the output current is approximately 2.1 $mA \cdot cm^{-2}$ over 8 h.

16. The self-powered Haber-Bosch reactor of claim 14, wherein the self-powered Haber-Bosch reactor has a self-powered $NH_3$ yield of at least 4 $mM \cdot h^{-1}$ per hour by measuring solution volume involved in the cathode reaction.

* * * * *